United States Patent
Tseng et al.

(10) Patent No.: US 10,495,945 B2
(45) Date of Patent: Dec. 3, 2019

(54) DUAL LENS DRIVING APPARATUS AND ELECTRONIC DEVICE

(71) Applicant: LARGAN DIGITAL CO., LTD., Taichung (TW)

(72) Inventors: Te-Sheng Tseng, Taichung (TW); Wen-Hung Hsu, Taichung (TW); Yung-Chun Kang, Taichung (TW)

(73) Assignee: LARGAN DIGITAL CO., LTD., Taichung (TW)

( * ) Notice: Subject to any disclaimer, the term of this patent is extended or adjusted under 35 U.S.C. 154(b) by 247 days.

(21) Appl. No.: 15/598,471

(22) Filed: May 18, 2017

(65) Prior Publication Data

US 2018/0234629 A1 Aug. 16, 2018

(30) Foreign Application Priority Data

Feb. 10, 2017 (TW) .............................. 106202010 U

(51) Int. Cl.

| | |
|---|---|
| *G03B 5/00* | (2006.01) |
| *G02B 7/02* | (2006.01) |
| *G02B 27/64* | (2006.01) |
| *H04N 5/225* | (2006.01) |
| *G02B 7/08* | (2006.01) |
| *G03B 3/10* | (2006.01) |
| *G03B 19/22* | (2006.01) |

(52) U.S. Cl.
CPC ............... *G03B 5/00* (2013.01); *G02B 7/021* (2013.01); *G02B 7/022* (2013.01); *G02B 7/08* (2013.01); *G02B 27/646* (2013.01); *G03B 3/10* (2013.01); *G03B 19/22* (2013.01); *H04N 5/2254* (2013.01); *H04N 5/2258* (2013.01); *G03B 2205/0015* (2013.01); *G03B 2205/0069* (2013.01)

(58) Field of Classification Search
CPC . G03B 5/00; G03B 3/10; G03B 19/22; G02B 7/021; G02B 7/022; G02B 7/08; G02B 27/646; H04N 5/2254; H04N 5/2258
See application file for complete search history.

(56) References Cited

U.S. PATENT DOCUMENTS

| 8,941,721 B2 | 1/2015 | Kim et al. | |
|---|---|---|---|
| 9,083,873 B1 * | 7/2015 | Lewkow | ................ G02B 7/021 |
| 9,300,874 B1 | 3/2016 | Lu et al. | |
| 2011/0199694 A1 * | 8/2011 | Kimoto | .................... G02B 7/08 |
| | | | 359/822 |

(Continued)

*Primary Examiner* — Antoinette T Spinks
(74) *Attorney, Agent, or Firm* — McClure, Qualey & Rodack, LLP

(57) ABSTRACT

A dual lens driving apparatus includes a holder, a metal yoke, a carrier, a first coil, at least one magnet and at least one first sensing component. The carrier is movably disposed in the metal yoke, wherein the carrier includes a first receiving space and a second receiving space, the first receiving space and the second receiving space are for receiving a first lens assembly and a second lens assembly respectively, a central axis of the first receiving space and a central axis of the second receiving space are parallel, the carrier can be moved at least along a first direction, and the first direction is parallel to the two central axes. The magnet is movably disposed in the metal yoke, wherein the magnet can be moved at least along a second direction, and the second direction is vertical to the two central axes.

24 Claims, 21 Drawing Sheets

(56) References Cited

U.S. PATENT DOCUMENTS

| | | |
|---|---|---|
| 2015/0070781 A1 | 3/2015 | Cheng et al. |
| 2015/0316744 A1 | 11/2015 | Chen |
| 2015/0316745 A1 | 11/2015 | Chen et al. |
| 2017/0155311 A1* | 6/2017 | Tseng ................. H02K 41/0356 |
| 2017/0155312 A1* | 6/2017 | Tseng ................. H02K 41/0356 |
| 2018/0074279 A1* | 3/2018 | Liu ........................ G02B 7/023 |
| 2018/0224625 A1* | 8/2018 | Tseng ..................... G03B 13/34 |
| 2018/0309916 A1* | 10/2018 | Park ..................... H04N 5/2253 |

* cited by examiner

DUAL LENS DRIVING APPARATUS AND ELECTRONIC DEVICE

RELATED APPLICATIONS

This application claims priority to Taiwan Application Serial Number 106202010, filed Feb. 10, 2017, which is herein incorporated by reference.

BACKGROUND

Technical Field

The present disclosure relates to a lens driving apparatus. More particularly, the present disclosure relates to a dual lens driving apparatus which is applicable to portable electronic devices.

Description of Related Art

In general, the voice coil motor (VCM) is applied to the lens assembly in the electronic device for providing an auto-focusing function, and the spring plates of the voice coil motor are assembled on the carrier. When the spring plates are deformed by force to provide moving freedom and restoring force for the carrier, the lens assembly can be carried to move by the carrier so as to achieve the auto-focusing function.

Moreover, in order to satisfy the shooting demands of a wider range, the electronic devices equipped with a dual lens module gradually become mainstream products in the market. However, two lens assemblies of the dual lens module respectively driven by different voice coil motors may result in too large focusing time difference and increasing the power consumption thereof, so as to affect the user experiences.

Given the above, how to reduce the focusing time difference between two lens assemblies, meet the power consumption needs of the electronic devices, enhance the image quality, and thereby satisfy of the requirements of the electronic devices in high-end imaging and optical anti-shake function has become one of the important subjects.

SUMMARY

According to one aspect of the present disclosure, a dual lens driving apparatus includes a holder, a metal yoke, a carrier, a first coil, at least one magnet and at least one first sensing component. The holder includes at least one holder opening. The metal yoke is disposed correspondingly to the holder, wherein the metal yoke includes a front end portion, at least one metal yoke opening is located on the front end portion, and the metal yoke opening is disposed correspondingly to the holder opening. The carrier is movably disposed in the metal yoke, wherein the carrier includes a first receiving space and a second receiving space, the first receiving space and the second receiving space are for receiving a first lens assembly and a second lens assembly respectively, a central axis of the first receiving space and a central axis of the second receiving space are parallel, the carrier can be moved at least along a first direction, and the first direction is parallel to the two central axes. The first coil surrounds and is disposed on the carrier. The magnet is movably disposed in the metal yoke, wherein the magnet can be moved at least along a second direction, and the second direction is vertical to the two central axes. The first sensing component is adjacent to and faces the magnet, wherein the first sensing component is for sensing a displacement along the second direction of the magnet. When a maximum length of the carrier which is parallel to a vertical connection between the two central axes is CL, and a minimum length of the front end portion which is vertical to the vertical connection between the two central axes is YS, the following condition is satisfied: 1.18<CL/YS<4.0.

According to another aspect of the present disclosure, an electronic device includes the dual lens driving apparatus according to the foregoing aspect, the first lens assembly, the second lens assembly and two image sensors. The dual lens driving apparatus is for driving the first lens assembly and the second lens assembly, and an optical axis of the first lens assembly and an optical axis of the second lens assembly are parallel. The image sensors are respectively disposed on an image surface of the first lens assembly and an image surface of the second lens assembly.

DETAILED DESCRIPTION

1st Embodiment

Figure 1A:
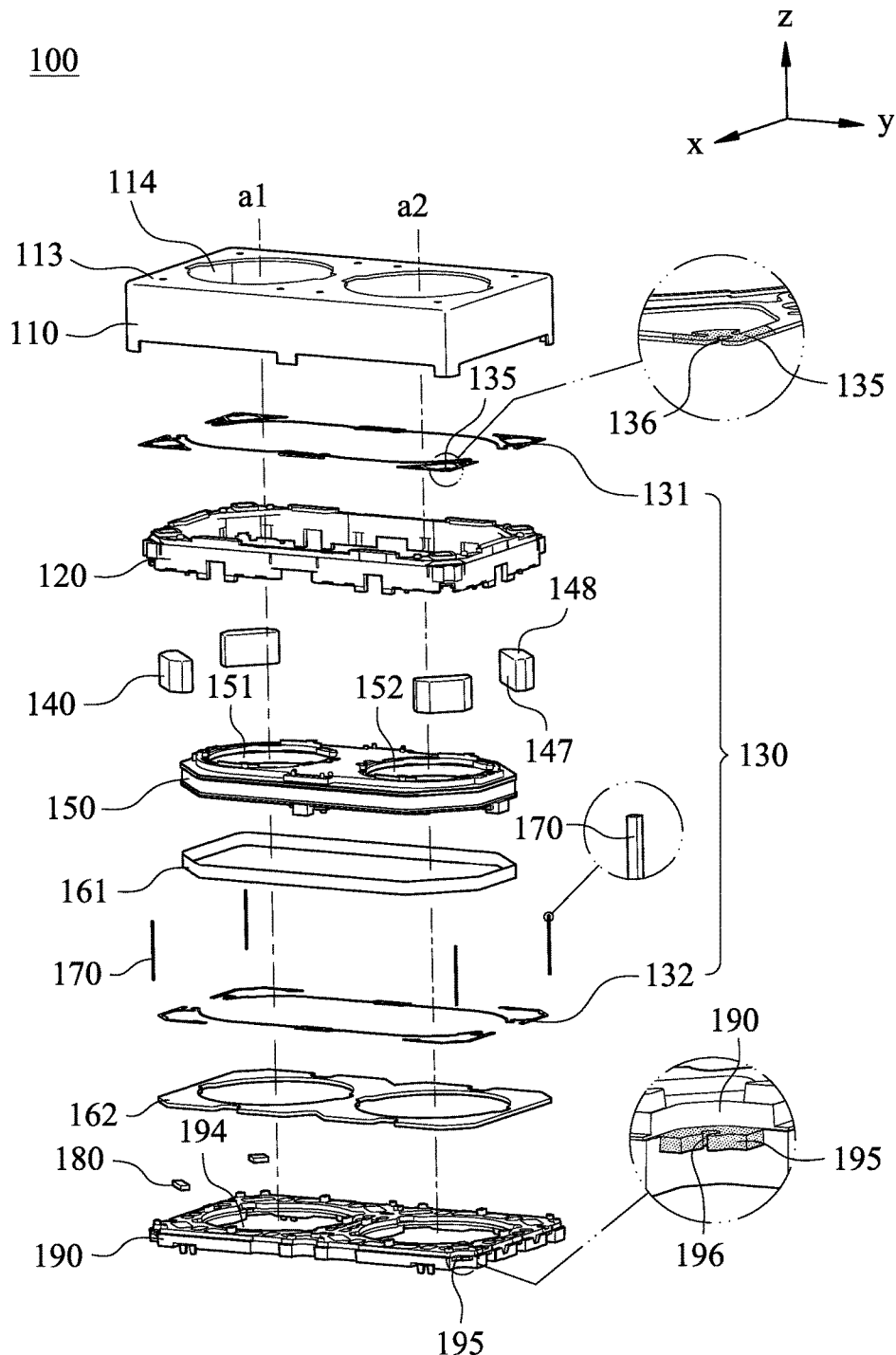
FIG. 1A is an exploded view of a dual lens driving apparatus according to the 1st embodiment of the present disclosure.

FIG. 1A is an exploded view of a dual lens driving apparatus 100 according to the 1st embodiment of the present disclosure. In FIG. 1A, the dual lens driving apparatus 100 includes a holder 190, a metal yoke 110, a carrier 150, a first coil 161, at least one magnet 140 and at least one first sensing component 180.

The holder 190 includes at least one holder opening 194. The metal yoke 110 is disposed correspondingly to the holder 190, thus an accommodating space is formed. The metal yoke 110 includes a front end portion 113, wherein at least one metal yoke opening 114 is located on the front end portion 113, and the metal yoke opening 114 is disposed correspondingly to the holder opening 194. Furthermore, the metal yoke 110 may be made of a metal material overall, or made of a metal material with just a part thereof, such as being processed with a metal coating, a metal painting on a surface of a nonmetal material. In the 1st embodiment, the front end portion 113 is rectangular. A number of the metal yoke opening 114 and a number of the holder opening 194 are both two, wherein each of the metal yoke openings 114 is disposed correspondingly to one of the holder openings 194.

Figure 1B:
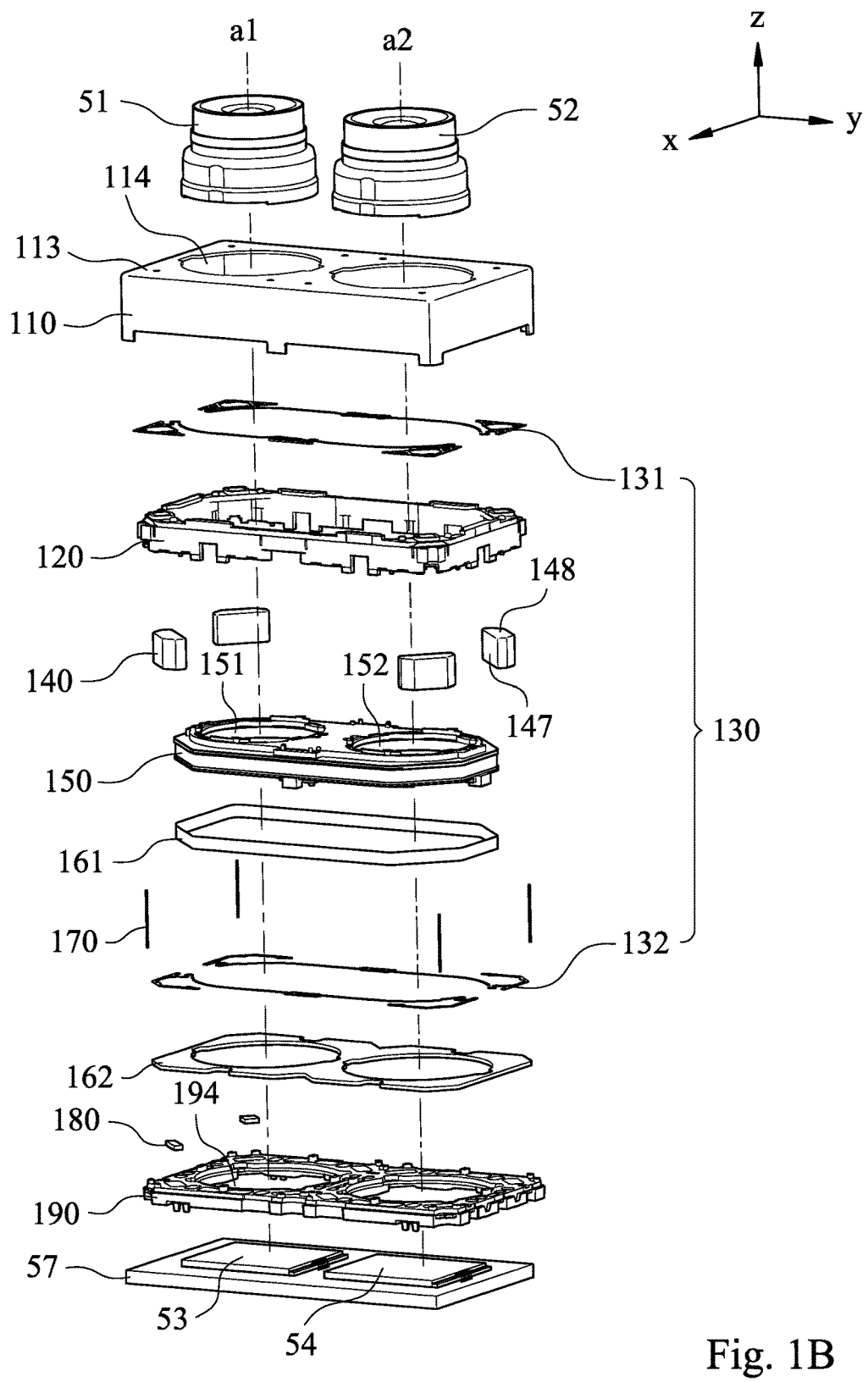
FIG. 1B is an exploded view of the dual lens driving apparatus according to the 1st embodiment, a first lens assembly and a second lens assembly.
Figure 1C:
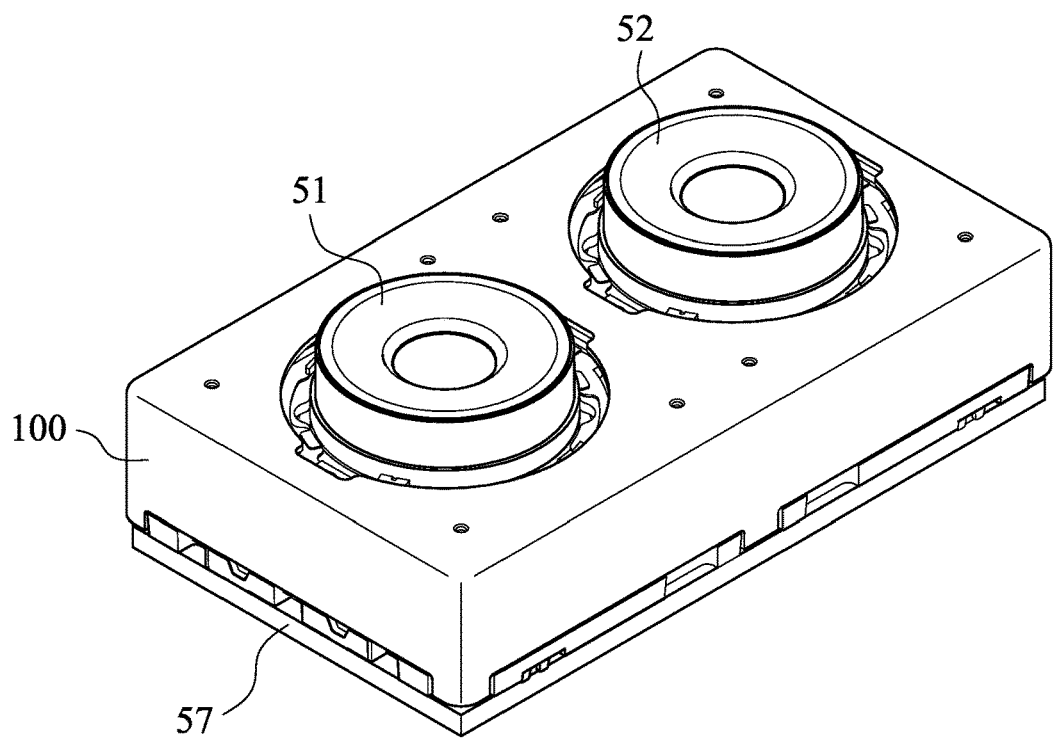
FIG. 1C is a three-dimensional view of the dual lens driving apparatus according to the 1st embodiment, the first lens assembly and the second lens assembly being assembled.
Figure 1D:
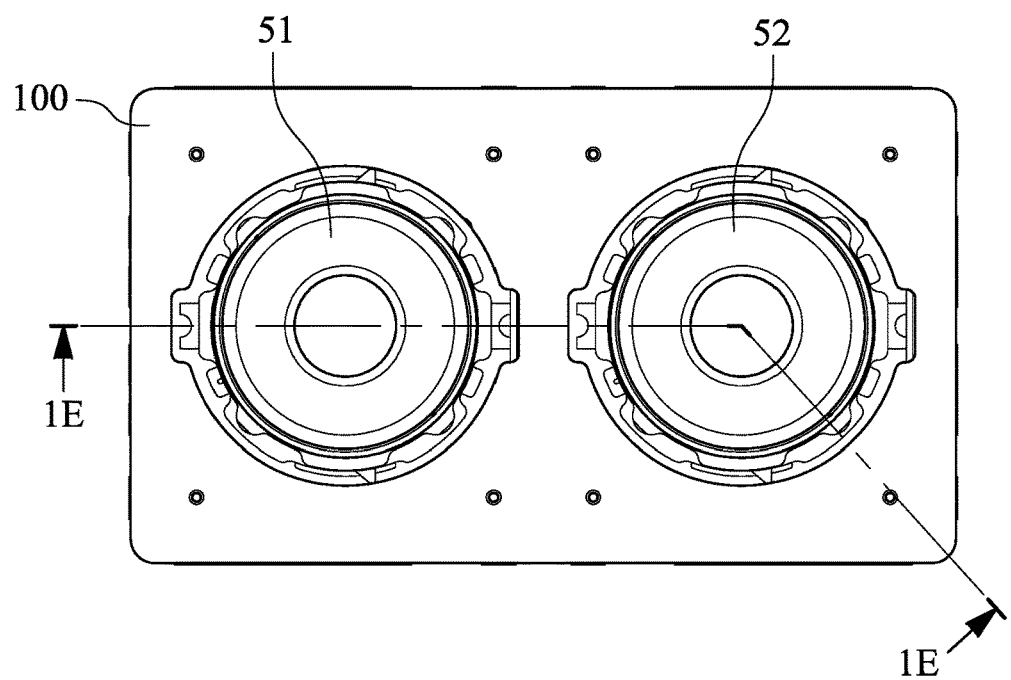
FIG. 1D is a top view of the dual lens driving apparatus according to the 1st embodiment, the first lens assembly and the second lens assembly being assembled.
Figure 1E:
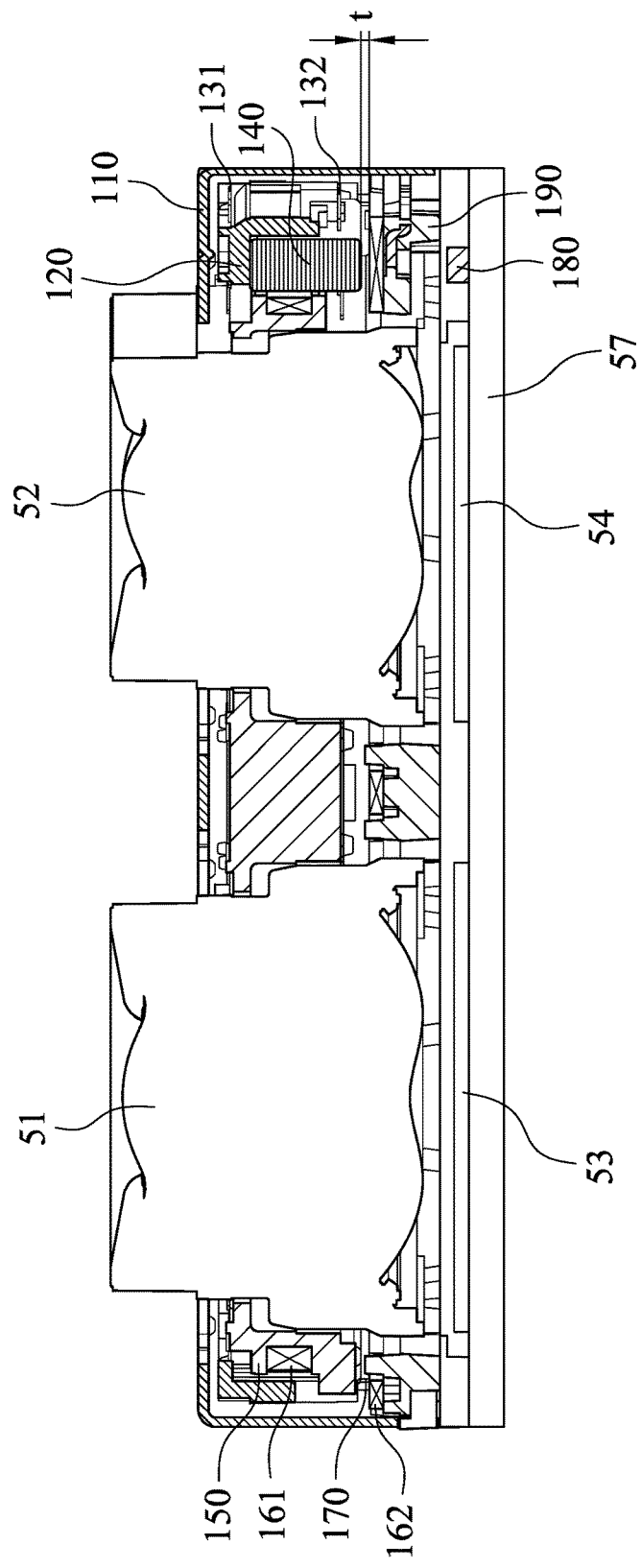
FIG. 1E is a cross-sectional view along line 1E-1E of FIG. 1D.

FIG. 1B is an exploded view of the dual lens driving apparatus 100 according to the 1st embodiment, a first lens assembly 51 and a second lens assembly 52; FIG. 1C is a three-dimensional view of the dual lens driving apparatus 100, the first lens assembly 51 and the second lens assembly 52 being assembled; FIG. 1D is a top view of the dual lens driving apparatus 100, the first lens assembly 51 and the second lens assembly 52 being assembled; and FIG. 1E is a cross-sectional view along line 1E-1E of FIG. 1D. In FIG. 1A to FIG. 1E, the carrier 150 is movably disposed in the metal yoke 110, wherein the carrier 150 includes a first receiving space 151 and a second receiving space 152, the first receiving space 151 and the second receiving space 152 are for receiving the first lens assembly 51 and the second lens assembly 52 respectively, a central axis a1 of the first receiving space 151 and a central axis a2 of the second receiving space 152 are parallel, the carrier 150 can be moved at least along a first direction z, and the first direction z is parallel to the two central axes a1 and a2. In the 1st embodiment, the first receiving space 151 corresponding to one of the metal yoke openings 114 and one of the holder openings 194 is for receiving the first lens assembly 51, wherein the central axis a1 passing through the one of the metal yoke openings 114 and the one of the holder openings 194 is also an optical axis of the first lens assembly 51. The second receiving space 152 corresponding to the other of the metal yoke openings 114 and the other of the holder openings 194 is for receiving the second lens assembly 52, wherein the central axis a2 passing through the other of the metal yoke openings 114 and the other of the holder openings 194 is also an optical axis of the second lens assembly 52. In other embodiments (not shown in drawings), a number of a metal yoke opening may be one, wherein a first receiving space and a second receiving space are respectively corresponding to two portions of the metal yoke opening. A number of the holder opening may be one, wherein the first receiving space and the second receiving space are respectively corresponding to two portions of the holder opening.

The first coil 161 surrounds, and is disposed and fixed on the carrier 150. The magnet 140 is movably disposed in the metal yoke 110, wherein the magnet 140 can be moved at least along a second direction x, and the second direction x is vertical to the two central axes a1 and a2. In the 1st embodiment, a number of the magnet 140 is four, wherein the magnets 140 are movably disposed in four corners of the metal yoke 110, which are respectively corresponding to four corners of the front end portion 113. The second direction x may be any directions vertical to the two central axes a1 and a2.

Figure 1F:
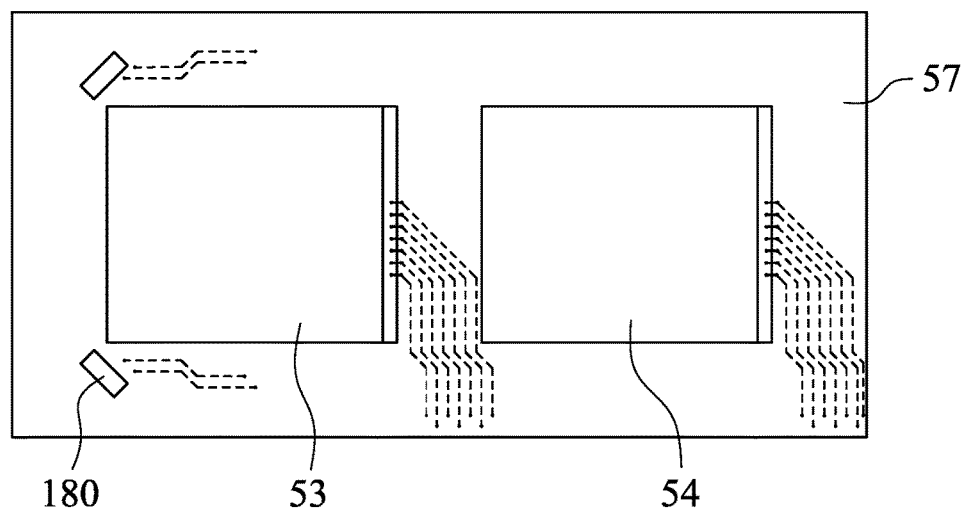
FIG. 1F is a schematic view of the first sensing component according to the 1st embodiment.

FIG. 1F is a schematic view of the first sensing component 180 according to the 1st embodiment. In FIG. 1B and FIG. 1F, the first sensing component 180 is adjacent to and faces the magnet 140, wherein the first sensing component 180 is for sensing a displacement along the second direction x of the magnet 140 and can be a Hall sensor, a Hall element, a magnetic field sensor, a photodetector and so on. In the 1st embodiment, a number of the first sensing component 180 is two. The first sensing components 180 are disposed on a circuit board 57, which is adjacent to the holder 190 of the dual lens driving apparatus 100. The two first sensing components 180, which are respectively adjacent to and face two of the magnets 140 along the first direction z, are for sensing the displacements along the second direction x of the two magnets 140 respectively. In addition, image sensors 53 and 54 are disposed on the circuit board 57, and respectively corresponding to the first lens assembly 51 and the second lens assembly 52.

Figure 1G:
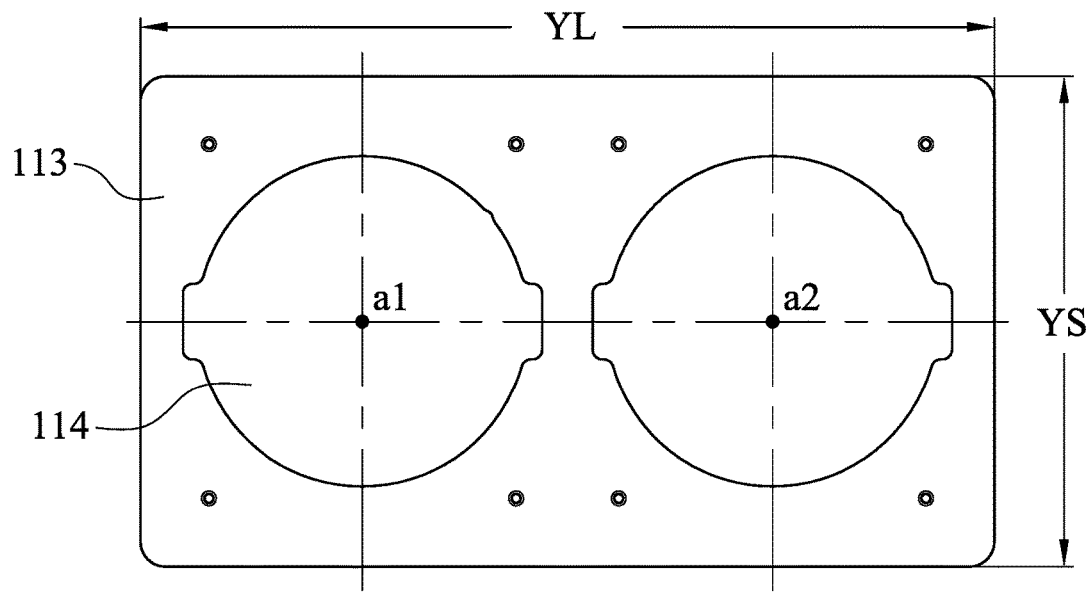
FIG. 1G is a top view of the metal yoke according to FIG. 1A.
Figure 1H:
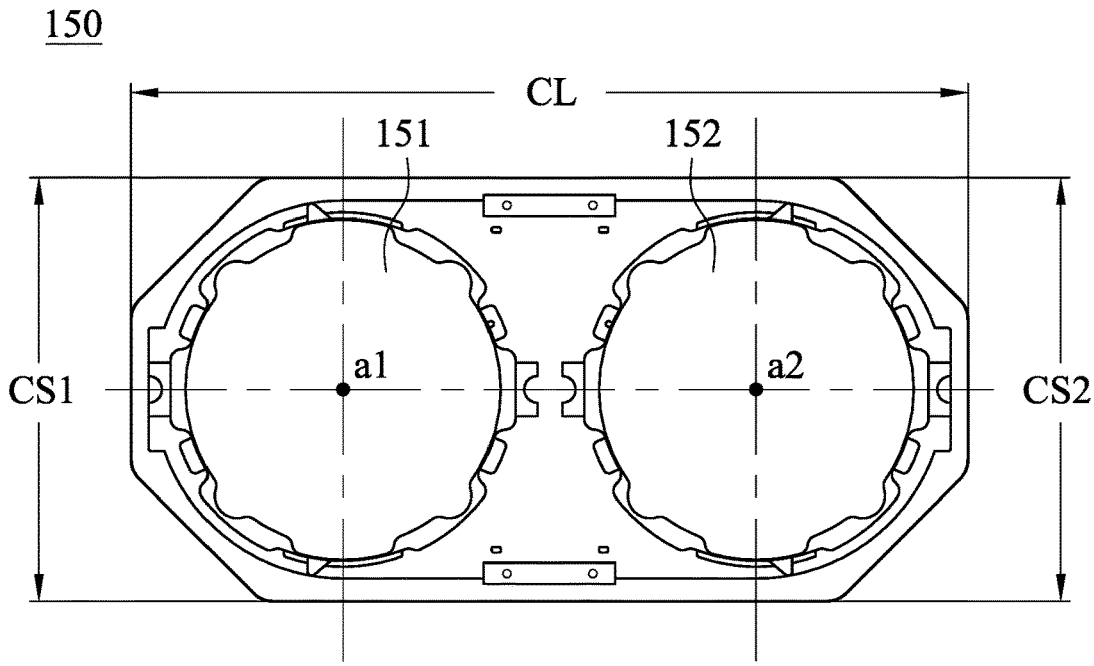
FIG. 1H is a top view of the carrier according to FIG. 1A.

FIG. 1G is a top view of the metal yoke 110 according to FIG. 1A, and FIG. 1H is a top view of the carrier 150 according to FIG. 1A. In FIG. 1G and FIG. 1H, when a maximum length of the carrier 150 which is parallel to a vertical connection between the two central axes a1 and a2 is CL, and a minimum length of the front end portion 113 which is vertical to the vertical connection between the two central axes a1 and a2 is YS, the following condition is satisfied: 1.18<CL/YS<4.0. Furthermore, the minimum length according to the parameter YS is provided on a plane with a normal direction parallel to the two axes a1 and a2. Therefore, the dual lens driving apparatus 100 driving both the first lens assembly 51 and the second lens assembly 52 is favorable for simultaneously compensating the shaking of the first lens assembly 51 and that of the second lens assembly 52, and obviously reducing the focusing time difference thereof, so as to prevent the focusing time difference from being too large and reduce the power consumption of a dual lens module.

In detail, when the maximum length of the carrier 150 which is parallel to the vertical connection between the two central axes a1 and a2 is CL, a length of the carrier 150 which is vertical to the vertical connection between the two central axes a1, a2 and passing through the central axis a1 of the first receiving space 151 is CS1, and a length of the carrier 150 which is vertical to the vertical connection between the two central axes a1, a2 and passing through the central axis a2 of the second receiving space 152 is CS2, the following conditions can be satisfied: 1.45<CL/CS1<4.5; and 1.45<CL/CS2<4.5. Furthermore, the lengths according to the parameters CS1 and CS2 are provided on a plane with a normal direction parallel to the two axes a1 and a2. Therefore, it is favorable for providing the first receiving space 151 and the second receiving space 152 of the carrier 150 while maintaining the manufacturability thereof, thereby enabling an injection molding method for the carrier 150, and effectively controlling the flatness, the warpage level and the structural integrity after assembling of the carrier 150.

In FIG. 1A and FIG. 1E, the dual lens driving apparatus 100 can further include at least three metal suspension wires 170, which are all disposed in the metal yoke 110 and parallel to the two central axes a1 and a2. Therefore, it is favorable for compensating the shaking totally by the metal suspension wires 170 and achieving a proper amount of compensation subsequently. In the 1st embodiment, a number of the metal suspension wires 170 is four, wherein the metal suspension wires 170 are respectively corresponding to the four corners of the metal yoke 110.

The carrier 150 can be moved along at least three directions. That is, the carrier 150 can have at least three degrees of freedom along three axes. The three directions are the first direction z, the second direction x and a third direction y, wherein the first direction z is orthogonal to both the second direction x and the third direction y. More specifically, the first direction z, the second direction x and the third direction y are orthogonal to each other, the first direction z is parallel to the two central axes a1 and a2, and the second direction x and the third direction y are both orthogonal to the two central axes a1 and a2. A number of the first sensing component 180 can be at least two, and the first sensing components 180 are Hall effect elements. Therefore, the first sensing components 180 can detect amounts of shaking in two degrees of freedom (along the second direction x and the third direction y), so that it is favorable for the actual shaking being detected by the first sensing components 180 and enhancing the compensation for shaking subsequently. In the 1st embodiment, the carrier 150 can be moved along the three directions totally, which are the first direction z, the second direction x and the third direction y.

The dual lens driving apparatus 100 can further include a frame 120 and a spring element 130, wherein the carrier 150 is disposed in the frame 120, the carrier 150 is connected to and can move together with the frame 120 specifically, and the frame 120 accommodates and is connected to the magnets 140. Furthermore, the spring element 130 is connected to the frame 120, wherein the spring element 130 includes at least three wire-connecting portions 135, the wire-connecting portions 135 are respectively corresponding to the metal suspension wires 170, and each of the wire-connecting portions 135 is connected to one end of one of the metal suspension wires 170 which is corresponding thereto. Therefore, the first coil 161 can serve as a conductive path for an external driving current being induced by current in the metal suspension wires 170 and the spring element 130 of metal material. In the 1st embodiment, the four magnets 140 are disposed in and connected to the frame 120, and respectively corresponding to the four corners of the metal yoke 110. The spring element 130 includes four wire-connecting portions 135, wherein the four wire-connecting portions 135 are respectively corresponding to the four corners of the metal yoke 110, and each of the wire-connecting portions 135 is connected to one end of one of the four metal suspension wires 170 which is corresponding thereto.

Figure 1I:
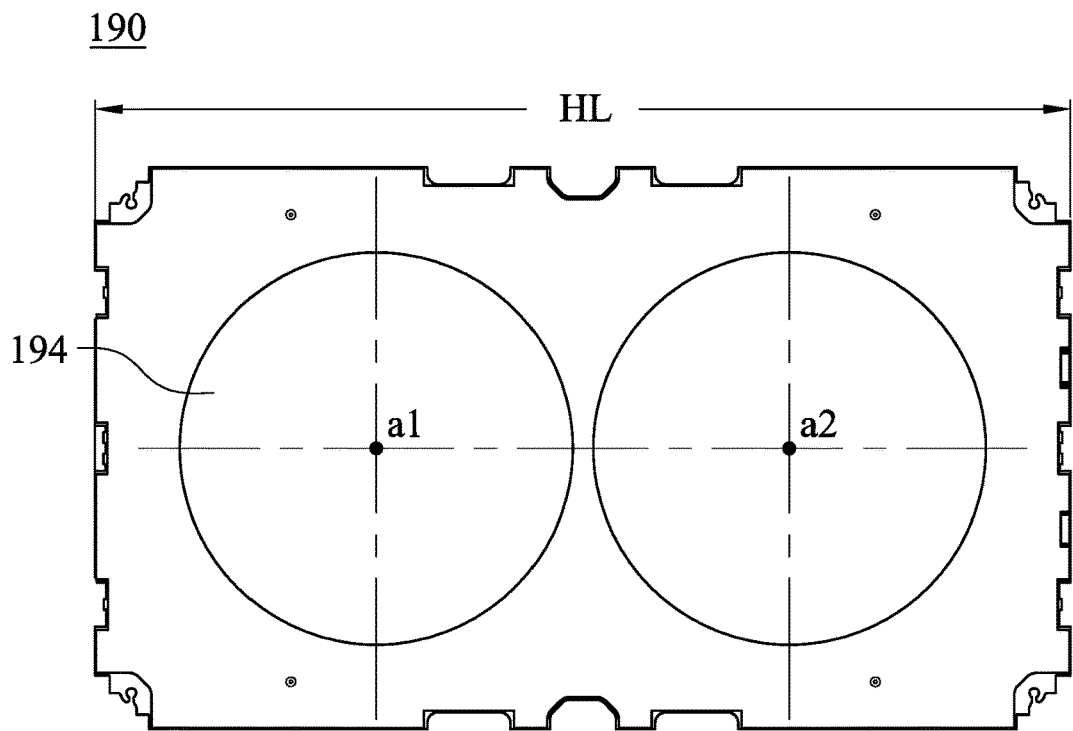
FIG. 1I is a top view of the holder according to FIG. 1A.

FIG. 1I is a top view of the holder 190 according to FIG. 1A. In FIG. 1A, FIG. 1G and FIG. 1I, the two holder openings 194 are respectively corresponding to the first receiving space 151 and the second receiving space 152. When a maximum length of the holder 190 which is parallel to the vertical connection between the two central axes a1 and a2 is HL, and the minimum length of the front end portion 113 which is vertical to the vertical connection between the two central axes a1 and a2 is YS, the following condition can be satisfied: 1.18<HL/YS<4.0. Therefore, it is favorable for providing the two holder openings 194 while maintaining the manufacturability thereof, thereby enabling an injection molding method for the holder 190 and effectively controlling the flatness, the warpage level and the structural integrity after assembling of the holder 190.

In FIG. 1A and FIG. 1E, the spring element 130 can include at least one first spring plate 131 and at least one second spring plate 132, wherein the first spring plate 131 is assembled on one side of the carrier 150 close to the front end portion 113 of the metal yoke 110, and the second spring plate 132 is assembled on one side of the carrier 150 far from the front end portion 113. Therefore, it is favorable for providing a degree of freedom along the two central axes a1 and a2 (i.e. along the first direction z) and the moving stability of the carrier 150, so as to reduce the deviation from the two central axes a1 and a2 during moving. In the 1st embodiment, a number of the first spring plate 131 is two, and a number of the second spring plate 132 is two.

Only the first spring plates 131 of the first spring plates 131 and the second spring plates 132 can include the wire-connecting portions 135, and the first spring plates 131 are assembled with the frame 120. Therefore, the material and structural properties of the first spring plates 131 and the second spring plates 132 are favorable for simplifying the mechanical design for optical image stabilization (OIS), decreasing the space waste, and reducing the number and the cost of the parts. In addition, it is favorable for providing the carrier 150 a degree of freedom vertical to the two central axes a1 and a2. In the 1st embodiment, each of the two first spring plates 131 includes two of the wire-connecting portions 135. The first spring plates 131 are assembled with the frame 120 and the carrier 150. The second spring plates 132 are assembled with the carrier 150.

Figure 1J:
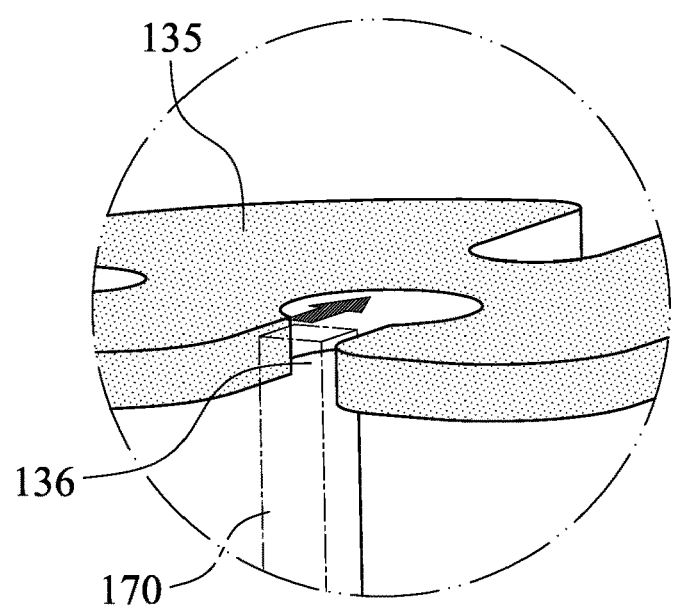
FIG. 1J is a schematic view of an assembling method for the wire-connecting portion and the metal suspension wire according to the 1st embodiment.

FIG. 1J is a schematic view of an assembling method for one of the wire-connecting portions 135 and one of the metal suspension wires 170 according to the 1st embodiment. In FIG. 1A and FIG. 1J, each of the wire-connecting portions 135 can include a notch 136 for the one of the metal suspension wires 170 which is corresponding thereto be shifted into the notch 136 during assembling the dual lens driving apparatus 100. Comparing with a conventional assembling method of passing a metal suspension wire through a hole being punched of a wire-connecting portion, the assembling method for the wire-connecting portions 135 and the metal suspension wires 170 according to the 1st embodiment of the present disclosure is favorable for enhancing the assembling conveniences and reducing the assembling difficulties of the dual lens driving apparatus 100. In addition, each of the metal suspension wires 170 and the corresponding notch 136 can be further joined and fixed by a method such as welding, hot stamping, heated association and so on.

In FIG. 1A, a volume proportion of each of the metal suspension wires 170 having a cross-sectional plane vertical to the two central axes a1 and a2 being square or rectangular can be above 95%. Therefore, the metal suspension wires 170 featured with the cross-sectional plane being square or rectangular are favorable for simplifying the production procedure and raising the manufacturing efficiency of the dual lens driving apparatus 100. In the 1st embodiment, a volume proportion of each of the metal suspension wires 170 having a cross-sectional plane vertical to the two central axes a1 and a2 being rectangular is above 95%.

The holder 190 can include at least three metal connecting portions 195 without being in contact with each other, wherein the metal connecting portions 195 are respectively corresponding to the metal suspension wires 170, and each of the metal connecting portions 195 is connected to the other end of one of the metal suspension wires 170 which is corresponding thereto. Therefore, it is favorable for simplifying the structural complexity for optical image stabilization, reducing unexpected tolerances resulted from more parts, and thereby avoiding the affect on the accuracy of the dual lens driving apparatus 100. In the 1st embodiment, the holder 190 includes four metal connecting portions 195 made of metal material. The four metal connecting portions 195 are not in contact with each other and respectively corresponding to the four corners of the metal yoke 110. Each of the four metal connecting portions 195 is connected to the other end of one of the four metal suspension wires 170 which is corresponding thereto. That is, two ends of each of the four metal suspension wires 170 are respectively connected to the corresponding one of the wire-connecting portions 135 (located on one of the first spring plates 131) and the corresponding one of the metal connecting portions 195 (located on the holder 190). Accordingly, the first coil 161 can serve as the conductive path for the external driving current being induced by current in the metal connecting portions 195, the metal suspension wires 170, the wire-connecting portions 135 and the first spring plates 131.

The metal connecting portions 195 can be disposed on the holder 190 by an insert molding method. Therefore, the metal connecting portions 195 joined with the plastic portions of the holder 190, and being applied by an injection molding method are favorable for constraining the assembling tolerances, and enhancing the quality of the dual lens driving apparatus 100 after assembling.

Figure 1K:
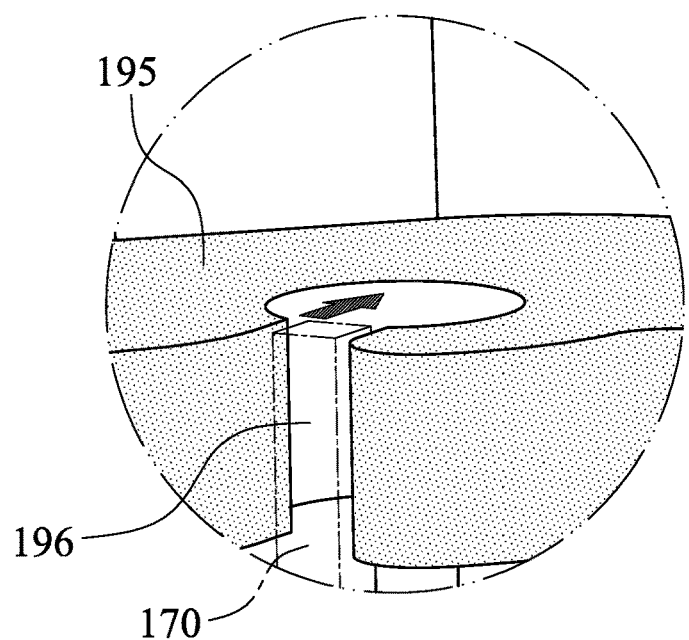
FIG. 1K is a schematic view of an assembling method for the metal connecting portion and the metal suspension wire according to the 1st embodiment.

FIG. 1K is a schematic view of an assembling method for one of the metal connecting portions 195 and one of the metal suspension wires 170 according to the 1st embodiment. In FIG. 1A and FIG. 1K, each of the metal connecting portions 195 can include a notch 196 for the one of the metal suspension wires 170 which is corresponding thereto be shifted into the notch 196 during assembling the dual lens driving apparatus 100. Comparing with a conventional assembling method of passing a metal suspension wire through a hole being punched of a metal connecting portion, the assembling method for the metal connecting portions 195 and the metal suspension wires 170 according to the 1st embodiment of the present disclosure is favorable for enhancing the assembling conveniences and reducing the assembling difficulties of the dual lens driving apparatus 100. In addition, each of the metal suspension wires 170 and the corresponding notch 196 can be further joined and fixed by a method such as welding, hot stamping, heated association and so on.

In FIG. 1A and FIG. 1E, each of the magnets 140 can include at least one parallel surface 147 and at least one vertical surface 148, wherein the parallel surface 147 is parallel to the two central axes a1 and a2, and the vertical surface 148 is vertical to the two central axes a1 and a2. That is, a normal direction of the parallel surface 147 is vertical to the two central axes a1 and a2, and a normal direction of the vertical surface 148 is parallel to the two central axes a1 and a2. Therefore, the magnets 140 featured with the aforementioned exterior design can simultaneously provide usages for two coils with different functions (i.e. the first coil 161 and a second coil 162), so as to effectively reduce the cost and save the space. In the 1st embodiment, each of the magnets 140 includes two vertical surfaces 148, and each of the parallel surfaces 147 connects the two vertical surfaces 148.

The dual lens driving apparatus 100 can further include at least one second coil 162 disposed between the magnets 140 and the holder 190, wherein the second coil 162 is for driving the carrier 150 and the magnets 140 to move along the second direction x. Therefore, it is favorable for increasing the space utilization efficiency inside the dual lens driving apparatus 100, enhancing the electromagnetic interaction efficiency between the magnets 140 and the second coil 162 so as to conserve the power consumption. In the 1st embodiment, the second coil 162 is a substrate wiring.

In FIG. 1E, when an air space distance parallel to the two central axes a1 and a2 between the second coil 162 and the vertical surfaces 148 facing the second coil 162 of the magnets 140 is t, the following condition can be satisfied: $0.02$ mm$<t<0.70$ mm. Therefore, it is favorable for further increasing the space utilization efficiency inside the dual lens driving apparatus 100, enhancing the electromagnetic interaction efficiency between the magnets 140 and the second coil 162 so as to conserve the power consumption. Preferably, the following condition can be satisfied: $0.05$ mm$<t<0.40$ mm. More preferably, the following condition can be satisfied: $0.05$ mm$<t<0.28$ mm.

The data of the aforementioned parameters of the dual lens driving apparatus 100 according to the 1st embodiment of the present disclosure are listed in the following Table 1, wherein the parameters are also shown as FIG. 1E, FIG. 1G, FIG. 1H and FIG. 1I. In FIG. 1G, a maximum length of the front end portion 113 which is parallel to the vertical connection between the two central axes a1 and a2 is YL.

TABLE 1

| 1st Embodiment | | | |
|---|---|---|---|
| YS (mm) | 10.39 | CL/YS | 1.50 |
| YL (mm) | 18.07 | CL/CS1 | 1.97 |
| CS1 (mm) | 7.88 | CL/CS2 | 1.97 |
| CS2 (mm) | 7.88 | HL/YS | 1.74 |
| CL (mm) | 15.55 | t (mm) | 0.12 |
| HL (mm) | 18.13 | | |

2nd Embodiment

Figure 2A:
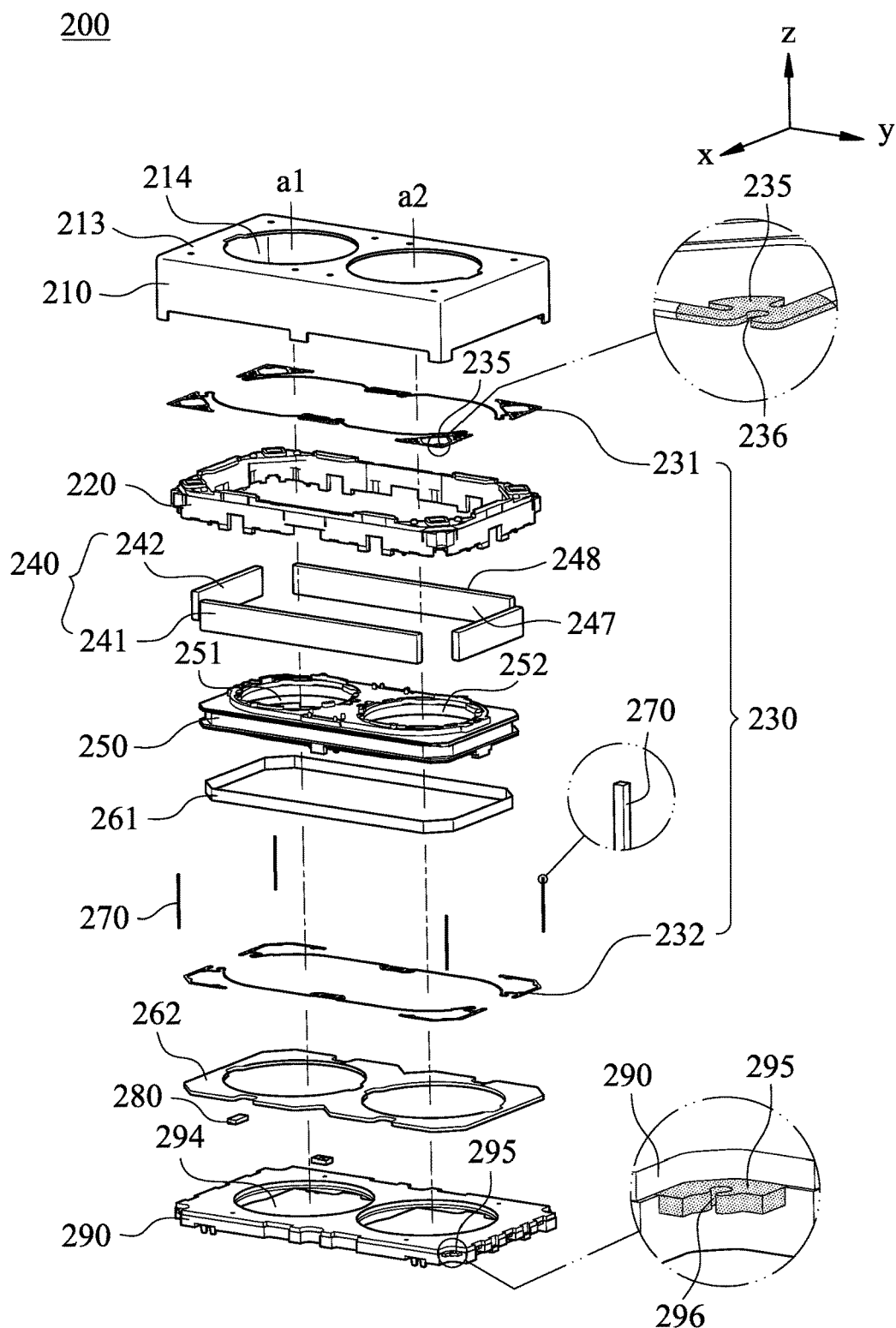
FIG. 2A is an exploded view of a dual lens driving apparatus according to the 2nd embodiment of the present disclosure.

FIG. 2A is an exploded view of a dual lens driving apparatus 200 according to the 2nd embodiment of the present disclosure. In FIG. 2A, the dual lens driving apparatus 200 includes a holder 290, a metal yoke 210, a carrier 250, a first coil 261, four magnets 240 and two first sensing components 280.

The holder 290 includes two holder openings 294. The metal yoke 210 is disposed correspondingly to the holder 290, thus an accommodating space is formed. The metal yoke 210 includes a front end portion 213 being rectangular, wherein two metal yoke openings 214 are located on the front end portion 213, and the two metal yoke openings 214 are disposed correspondingly to the two holder openings 294 respectively.

Figure 2B:
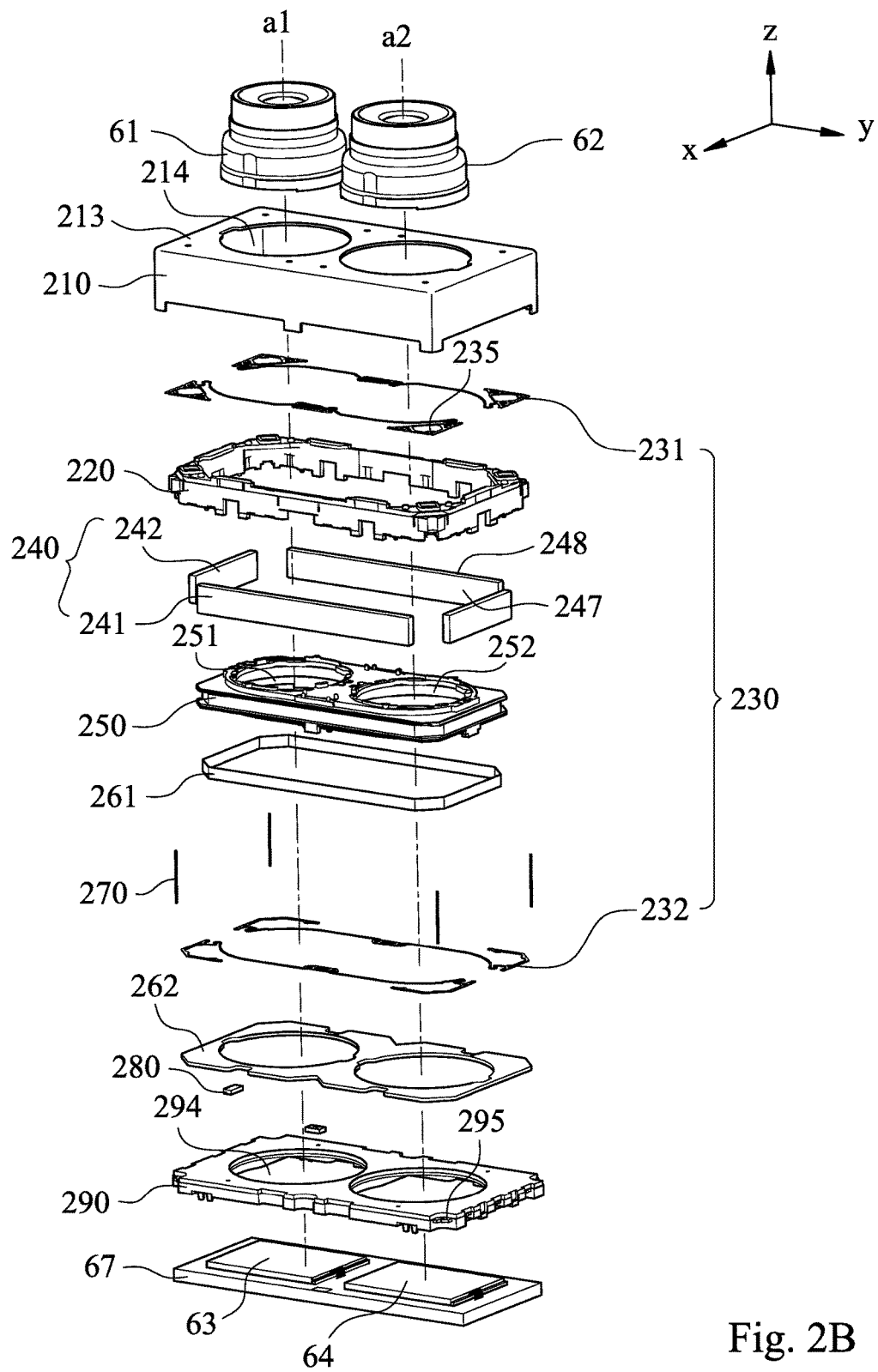
FIG. 2B is an exploded view of the dual lens driving apparatus according to the 2nd embodiment, a first lens assembly and a second lens assembly.
Figure 2C:
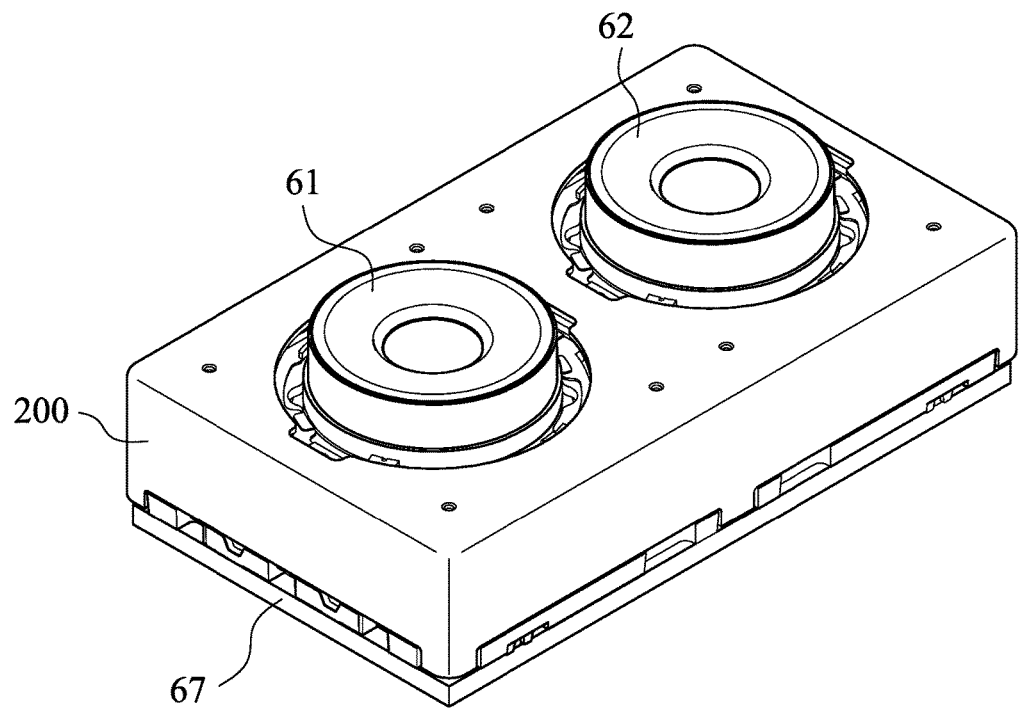
FIG. 2C is a three-dimensional view of the dual lens driving apparatus according to the 2nd embodiment, the first lens assembly and the second lens assembly being assembled.
Figure 2D:
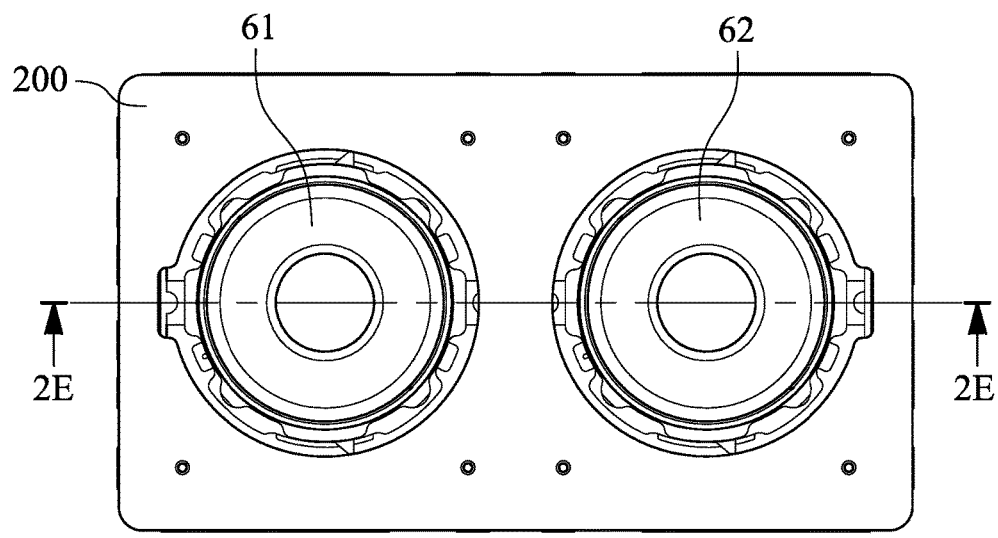
FIG. 2D is a top view of the dual lens driving apparatus according to the 2nd embodiment, the first lens assembly and the second lens assembly being assembled.
Figure 2E:
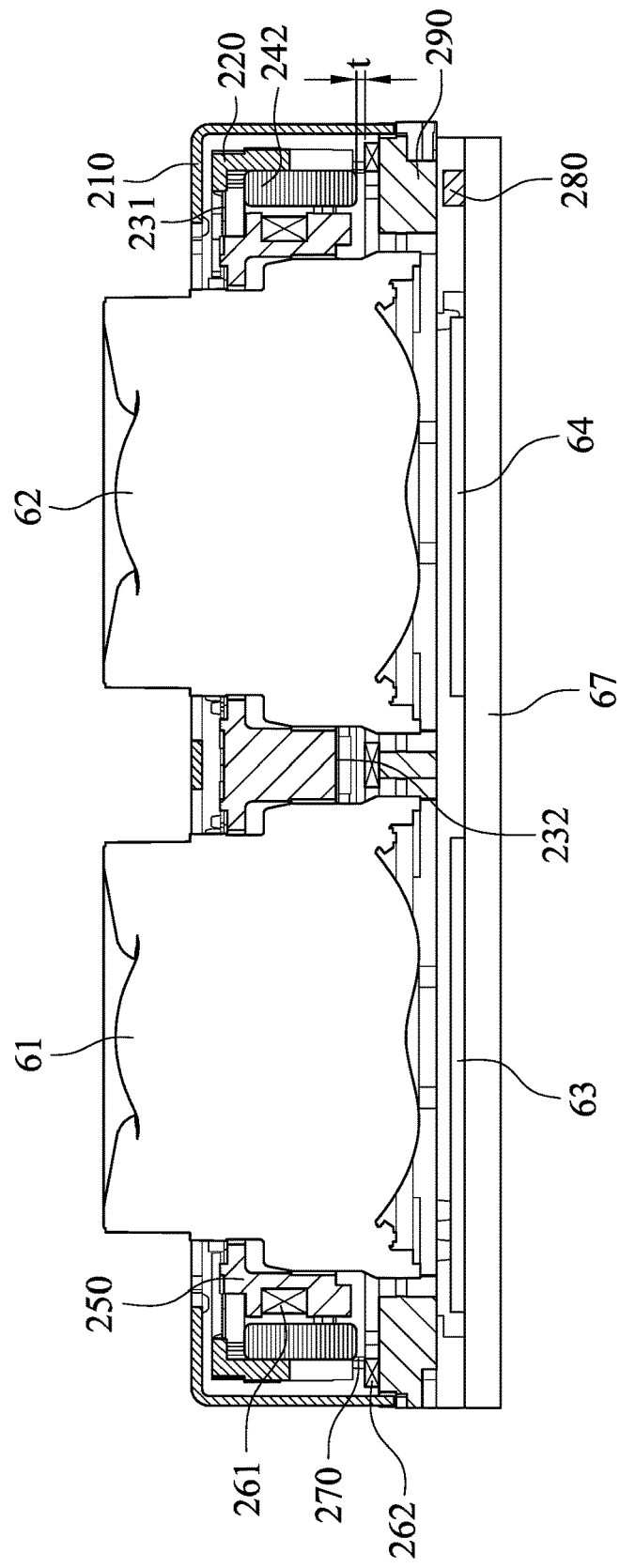
FIG. 2E is a cross-sectional view along line 2E-2E of FIG. 2D.

FIG. 2B is an exploded view of the dual lens driving apparatus 200 according to the 2nd embodiment, a first lens assembly 61 and a second lens assembly 62; FIG. 2C is a three-dimensional view of the dual lens driving apparatus 200, the first lens assembly 61 and the second lens assembly 62 being assembled; FIG. 2D is a top view of the dual lens driving apparatus 200, the first lens assembly 61 and the second lens assembly 62 being assembled; and FIG. 2E is a cross-sectional view along line 2E-2E of FIG. 2D. In FIG. 2A to FIG. 2E, the carrier 250 is movably disposed in the metal yoke 210, wherein the carrier 250 includes a first receiving space 251 and a second receiving space 252, the first receiving space 251 and the second receiving space 252 are for receiving the first lens assembly 61 and the second lens assembly 62 respectively, a central axis a1 of the first receiving space 251 and a central axis a2 of the second receiving space 252 are parallel, the carrier 250 can be moved at least along a first direction z, and the first direction z is parallel to the two central axes a1 and a2. In the 2nd embodiment, the first receiving space 251 corresponding to one of the metal yoke openings 214 and one of the holder openings 294 is for receiving the first lens assembly 61, wherein the central axis a1 passing through the one of the metal yoke openings 214 and the one of the holder openings 294 is also an optical axis of the first lens assembly 61. The second receiving space 252 corresponding to the other of the metal yoke openings 214 and the other of the holder openings 294 is for receiving the second lens assembly 62, wherein the central axis a2 passing through the other of the metal yoke openings 214 and the other of the holder openings 294 is also an optical axis of the second lens assembly 62.

The first coil 261 surrounds, and is disposed and fixed on the carrier 250. The magnets 240 are movably disposed in four corners of the metal yoke 210, which are respectively corresponding to four corners of the front end portion 213, wherein the magnets 240 can be moved at least along a second direction x, and the second direction x is vertical to the two central axes a1 and a2.

Figure 2F:
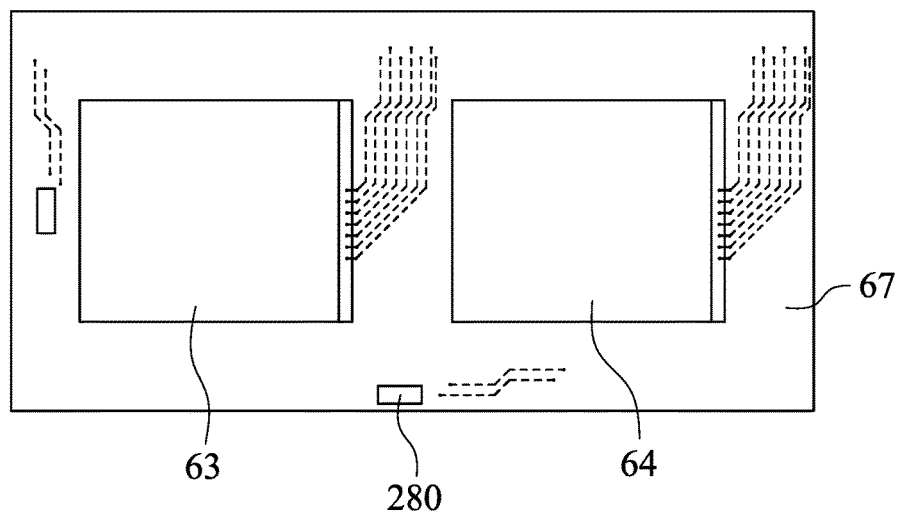
FIG. 2F is a schematic view of the first sensing component according to the 2nd embodiment.

FIG. 2F is a schematic view of the first sensing components 280 according to the 2nd embodiment. In FIG. 2B and FIG. 2F, the first sensing components 280 are adjacent to and face the magnets 240, wherein the first sensing components 280 are for sensing displacements along the second direction x of the magnets 240. More specifically, the first sensing components 280 are disposed on a circuit board 67, which is adjacent to the holder 290 of the dual lens driving apparatus 200. The two first sensing components 280, which are respectively adjacent to and face two of the magnets 240 along the first direction z, are for sensing the displacements along the second direction x of the two magnets 240 respectively. In addition, image sensors 63 and 64 are disposed on the circuit board 67, and respectively corresponding to the first lens assembly 61 and the second lens assembly 62.

In FIG. 2A and FIG. 2E, the dual lens driving apparatus 200 further includes four metal suspension wires 270, which are all disposed in the metal yoke 210 and parallel to the two central axes a1 and a2, wherein the metal suspension wires 270 are respectively corresponding to the four corners of the metal yoke 210.

The carrier 250 can be moved along three directions. That is, the carrier 250 has three degrees of freedom along three axes. The three directions are the first direction z, the second direction x and a third direction y, wherein the first direction z, the second direction x and the third direction y are orthogonal to each other, or the first direction z is orthogonal to both the second direction x and the third direction y while the second direction x is not orthogonal to the third direction y. That is, the first direction z is parallel to the two central axes a1 and a2, and the second direction x and the third direction y are both orthogonal to the two central axes a1 and a2. In addition, the two first sensing components 280 are Hall effect elements.

The dual lens driving apparatus 200 further includes a frame 220 and a spring element 230, wherein the carrier 250 is disposed in the frame 220, the carrier 250 is connected to and can move together with the frame 220 specifically, the frame 220 accommodates and is connected to the magnets 240, and the magnets 240 are corresponding to the four corners of the metal yoke 210. Furthermore, the spring element 230 of metal material is connected to the frame 220, wherein the spring element 230 includes four wire-connecting portions 235, the wire-connecting portions 235 are respectively corresponding to the metal suspension wires 270, and each of the wire-connecting portions 235 is connected to one end of one of the metal suspension wires 270 which is corresponding thereto.

The spring element 230 includes two first spring plates 231 and two second spring plates 232, wherein the first spring plates 231 are assembled on one side of the carrier 250 close to the front end portion 213 of the metal yoke 210, and the second spring plates 232 are assembled on one side of the carrier 250 far from the front end portion 213.

Only the first spring plates 231 of the first spring plates 231 and the second spring plates 232 include the wire-connecting portions 235. Each of the two first spring plates 231 includes two of the wire-connecting portions 235. The first spring plates 231 are assembled with the frame 220. More specifically, the first spring plates 231 are assembled with the frame 220 and the carrier 250. The second spring plates 232 are assembled with the carrier 250.

Each of the wire-connecting portions 235 includes a notch 236 for the one of the metal suspension wires 270 which is corresponding thereto be shifted into the notch 236 during assembling the dual lens driving apparatus 200.

In FIG. 2A, a volume proportion of each of the metal suspension wires 270 having a cross-sectional plane vertical to the two central axes a1 and a2 being square is above 95%.

In FIG. 2A and FIG. 2E, the holder 290 includes four metal connecting portions 295 made of metal material. The four metal connecting portions 295 are not in contact with each other and respectively corresponding to the metal suspension wires 270. Each of the four metal connecting portions 295 is connected to the other end of one of the four metal suspension wires 270 which is corresponding thereto. That is, two ends of each of the four metal suspension wires 270 are respectively connected to the corresponding one of the wire-connecting portions 235 (located on one of the first spring plates 231) and the corresponding one of the metal connecting portions 295 (located on the holder 290). The metal connecting portions 295 are disposed on the holder 290 by an insert molding method. Each of the metal connecting portions 295 includes a notch 296 for the one of the metal suspension wires 270 which is corresponding thereto be shifted into the notch 296 during assembling the dual lens driving apparatus 200.

In FIG. 2A, the magnets 240 are cuboid. Therefore, it is favorable for configuring other parts of the dual lens driving apparatus 200 so as to provide a margin of the spatial configuration in the dual lens driving apparatus 200.

A number of the magnets 240 is at least two, wherein at least one of the magnets 240 is a first cuboid magnet 241, and at least another one of the magnets 240 is a second cuboid magnet 242. The first cuboid magnet 241 and the second cuboid magnet 242 are alternatively arranged to surround the carrier 250, and a length along the carrier 250 of the first cuboid magnet 241 is greater than a length along the carrier 250 of the second cuboid magnet 242. Therefore, it is further favorable for configuring other parts of the dual lens driving apparatus 200 so as to provide the margin of the spatial configuration in the dual lens driving apparatus 200. More specifically, the number of the magnets 240 is four, wherein two of the magnets 240 are the first cuboid magnets 241, and the other two of the magnets 240 are the second cuboid magnets 242. The first cuboid magnets 241 and the second cuboid magnets 242 are alternatively arranged to surround the carrier 250, and the length along the carrier 250 of each of the first cuboid magnets 241 is greater than the length along the carrier 250 of each of the second cuboid magnets 242.

Each magnet of the first cuboid magnets 241 and the second cuboid magnets 242 includes four parallel surfaces 247 and two vertical surfaces 248, wherein the parallel surfaces 247 are parallel to the two central axes a1 and a2, and the vertical surfaces 248 are vertical to the two central axes a1 and a2. That is, a normal direction of each of the parallel surfaces 247 is vertical to the two central axes a1 and a2, and a normal direction of each of the vertical surfaces 248 is parallel to the two central axes a1 and a2.

In FIG. 2A and FIG. 2E, the dual lens driving apparatus 200 further includes a second coil 262 disposed between the magnets 240 and the holder 290, wherein the second coil 262 is for driving the carrier 250 and the magnets 240 to move along the second direction x.

Figure 2G:
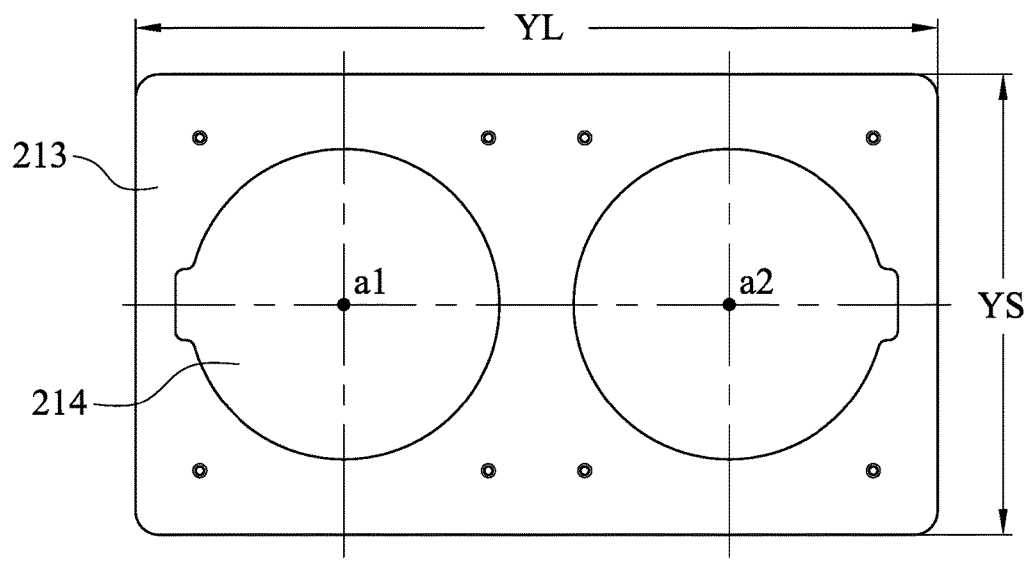
FIG. 2G is a top view of the metal yoke according to FIG. 2A.
Figure 2H:
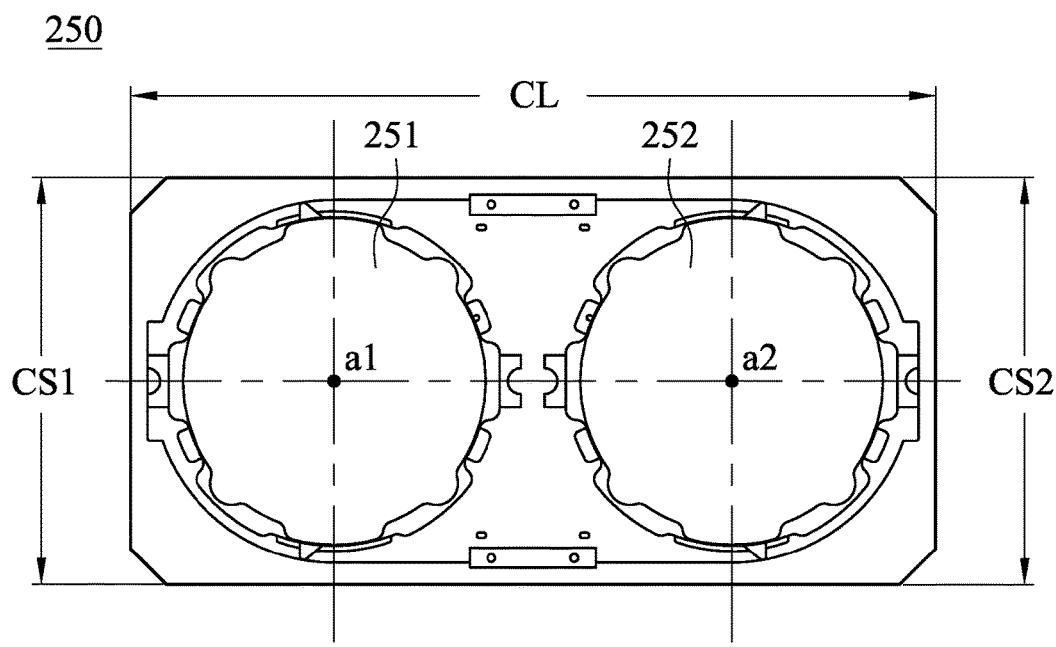
FIG. 2H is a top view of the carrier according to FIG. 2A.
Figure 2I:
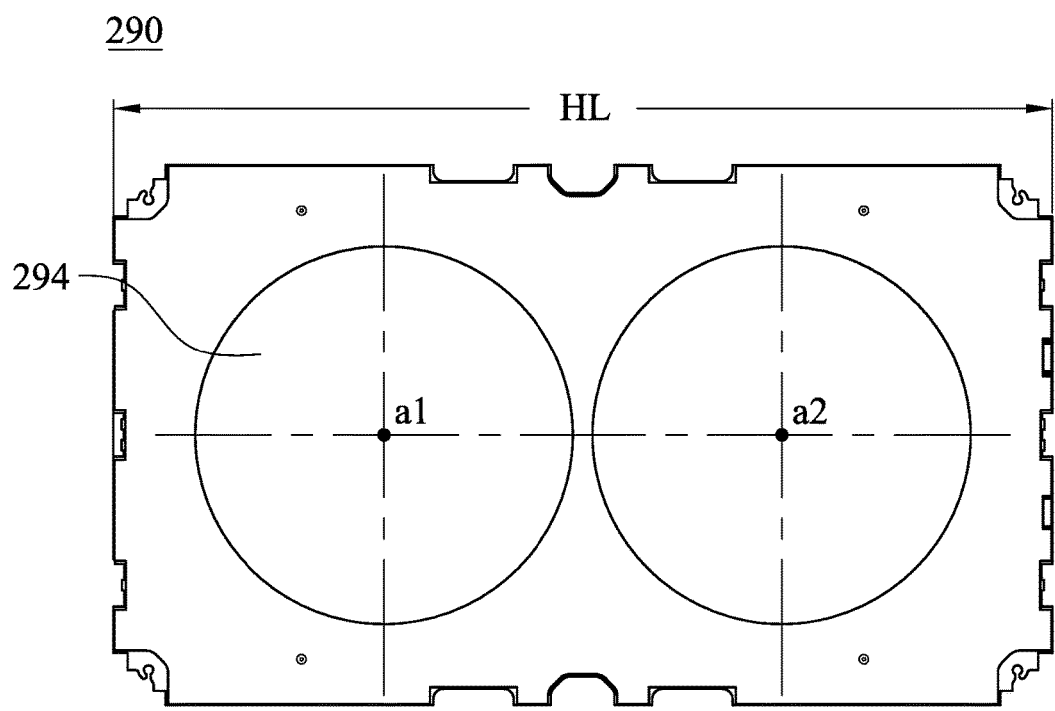
FIG. 2I is a top view of the holder according to FIG. 2A.

FIG. 2G is a top view of the metal yoke 210 according to FIG. 2A, FIG. 2H is a top view of the carrier 250 according to FIG. 2A, and FIG. 2I is a top view of the holder 290 according to FIG. 2A. The data of the parameters YS, YL, CS1, CS2, CL, HL, CL/YS, CL/CS1, CL/CS2, HL/YS and t of the dual lens driving apparatus 200 according to the 2nd embodiment of the present disclosure are listed in the following Table 2, wherein the parameters are also shown as FIG. 2E, FIG. 2G, FIG. 2H and FIG. 2I. The definitions of these parameters shown in Table 2 are the same as those stated in the dual lens driving apparatus 100 of the 1st embodiment with corresponding values for the dual lens driving apparatus 200.

TABLE 2

| 2nd Embodiment | | | |
|---|---|---|---|
| YS (mm) | 10.39 | CL/YS | 1.50 |
| YL (mm) | 18.07 | CL/CS1 | 1.97 |
| CS1 (mm) | 7.88 | CL/CS2 | 1.97 |
| CS2 (mm) | 7.88 | HL/YS | 1.74 |
| CL (mm) | 15.56 | t (mm) | 0.12 |
| HL (mm) | 18.13 | | |

3rd Embodiment

Figure 3A:
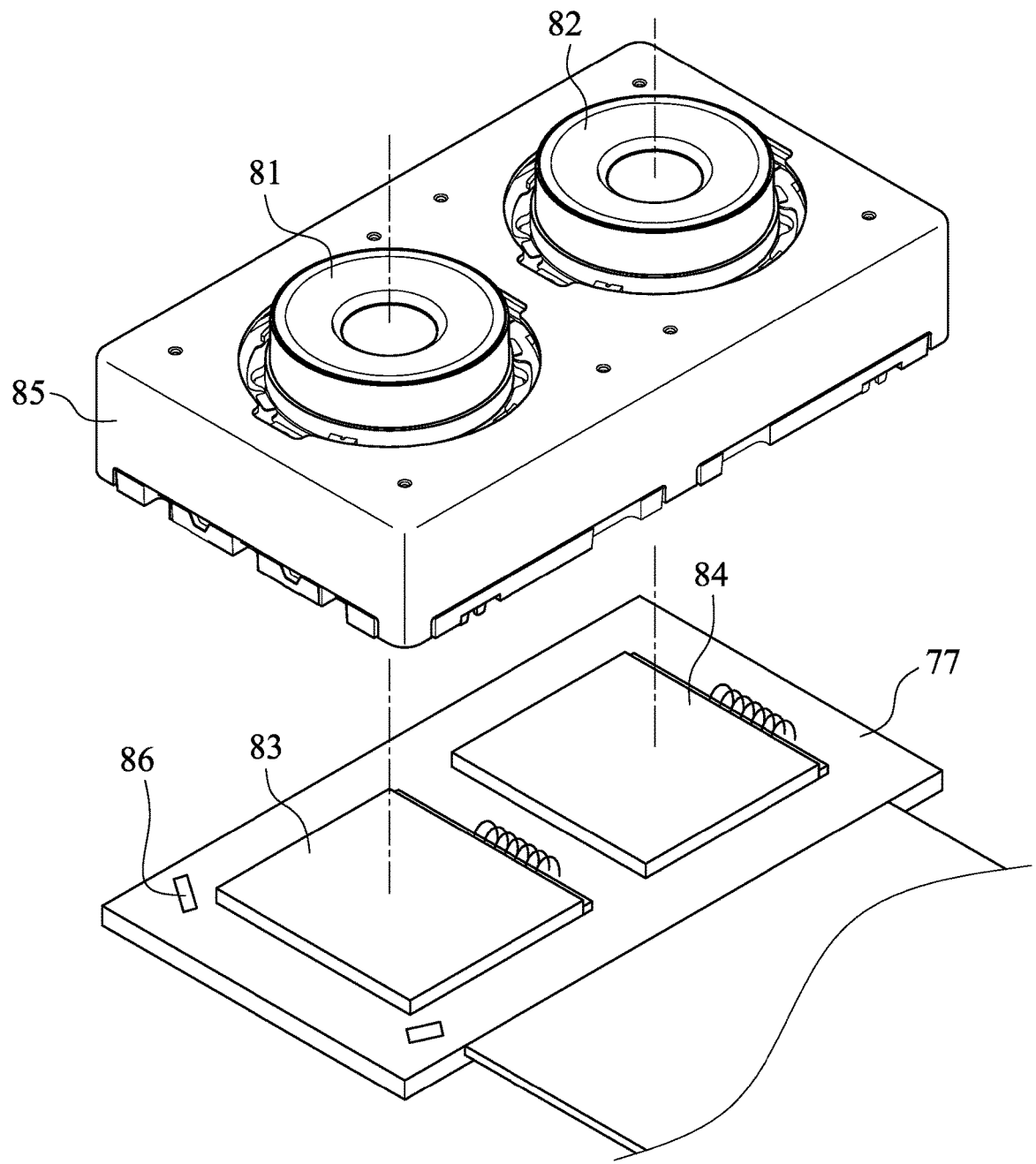
FIG. 3A is a schematic view of a dual lens driving apparatus according to the 3rd embodiment of the present disclosure, a first lens assembly and a second lens assembly.
Figure 3B:
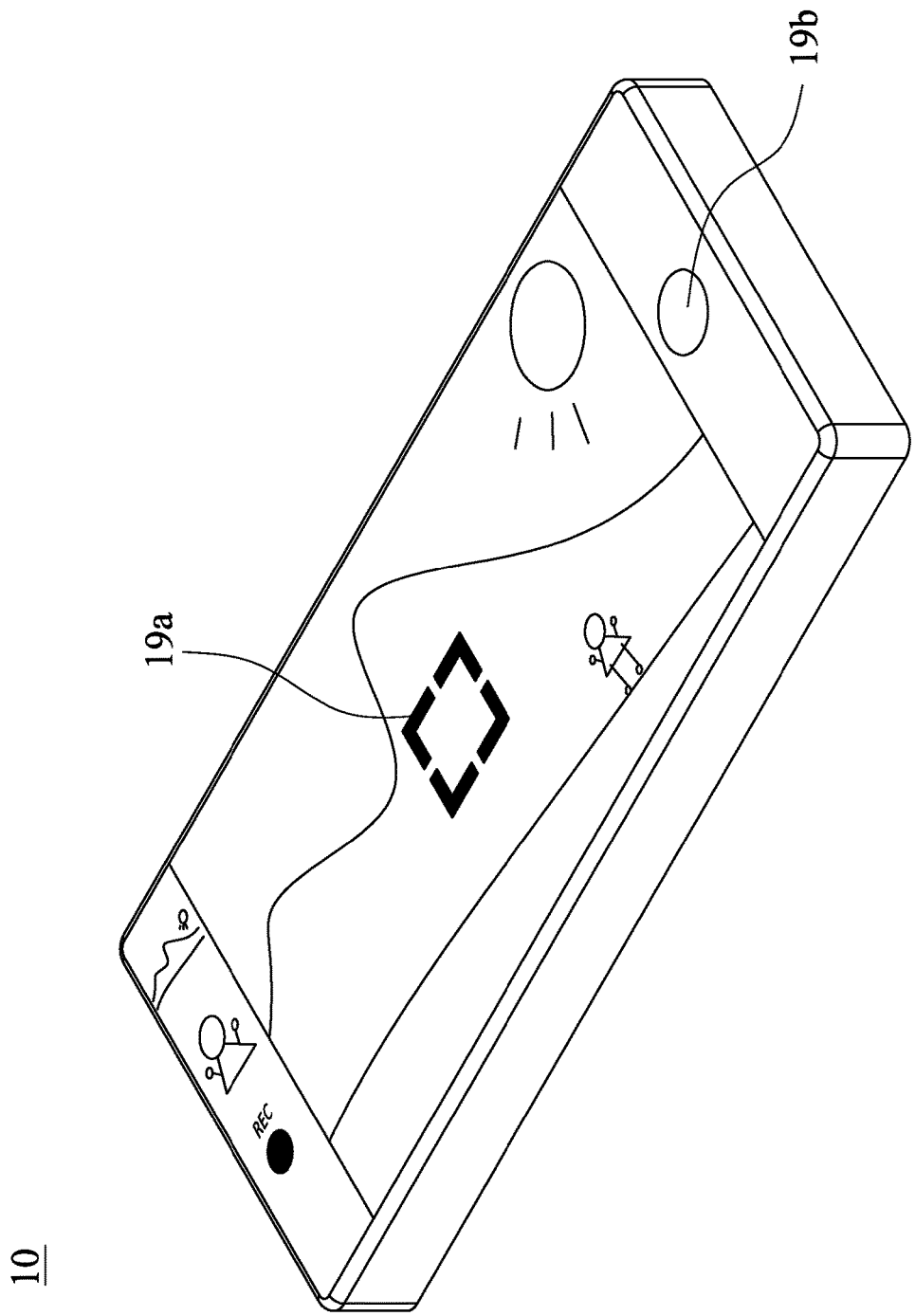
FIG. 3B shows a schematic view of an electronic device according to the 3rd embodiment of the present disclosure.
Figure 3C:
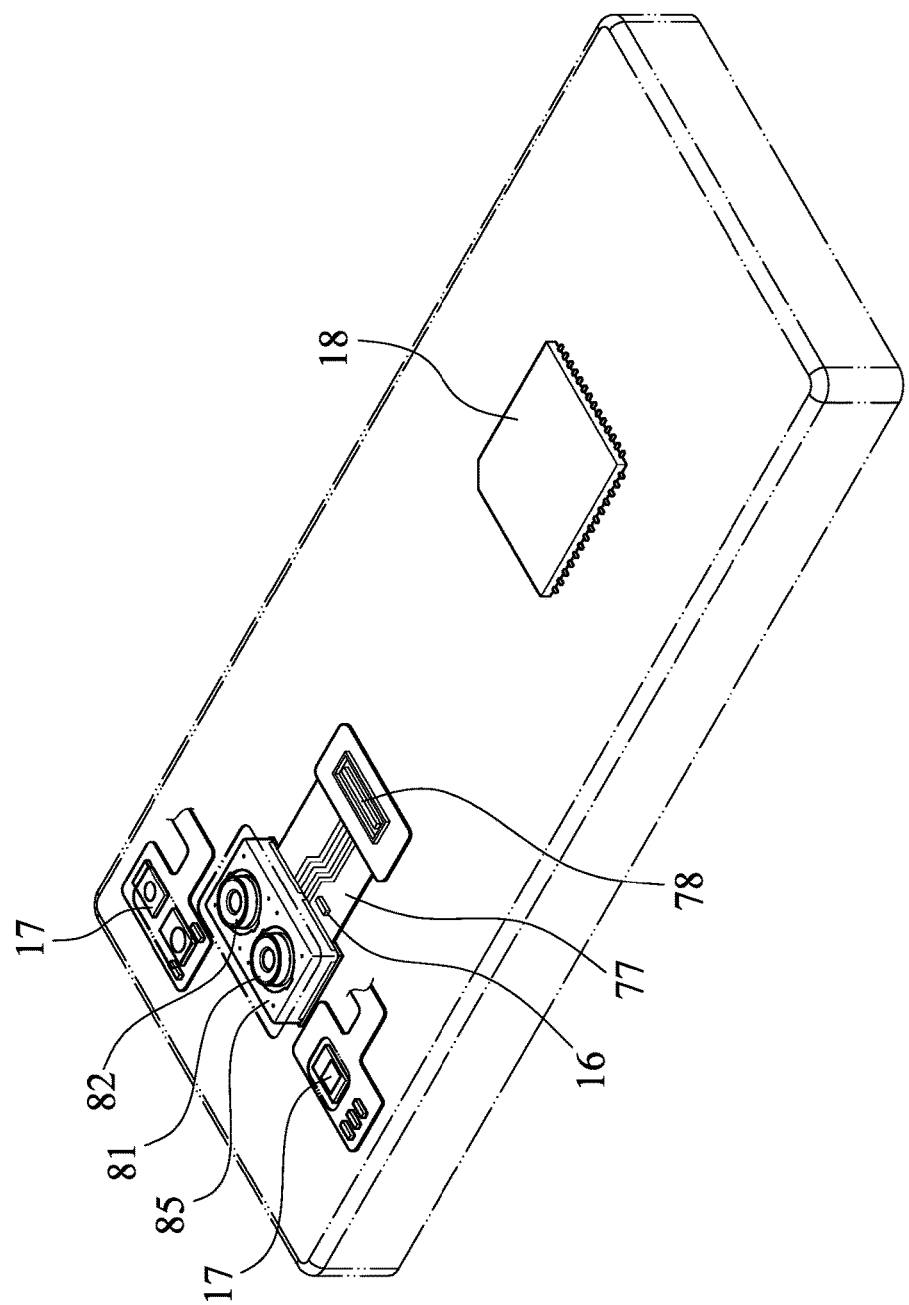
FIG. 3C shows another schematic view of the electronic device according to the 3rd embodiment.
Figure 3D:
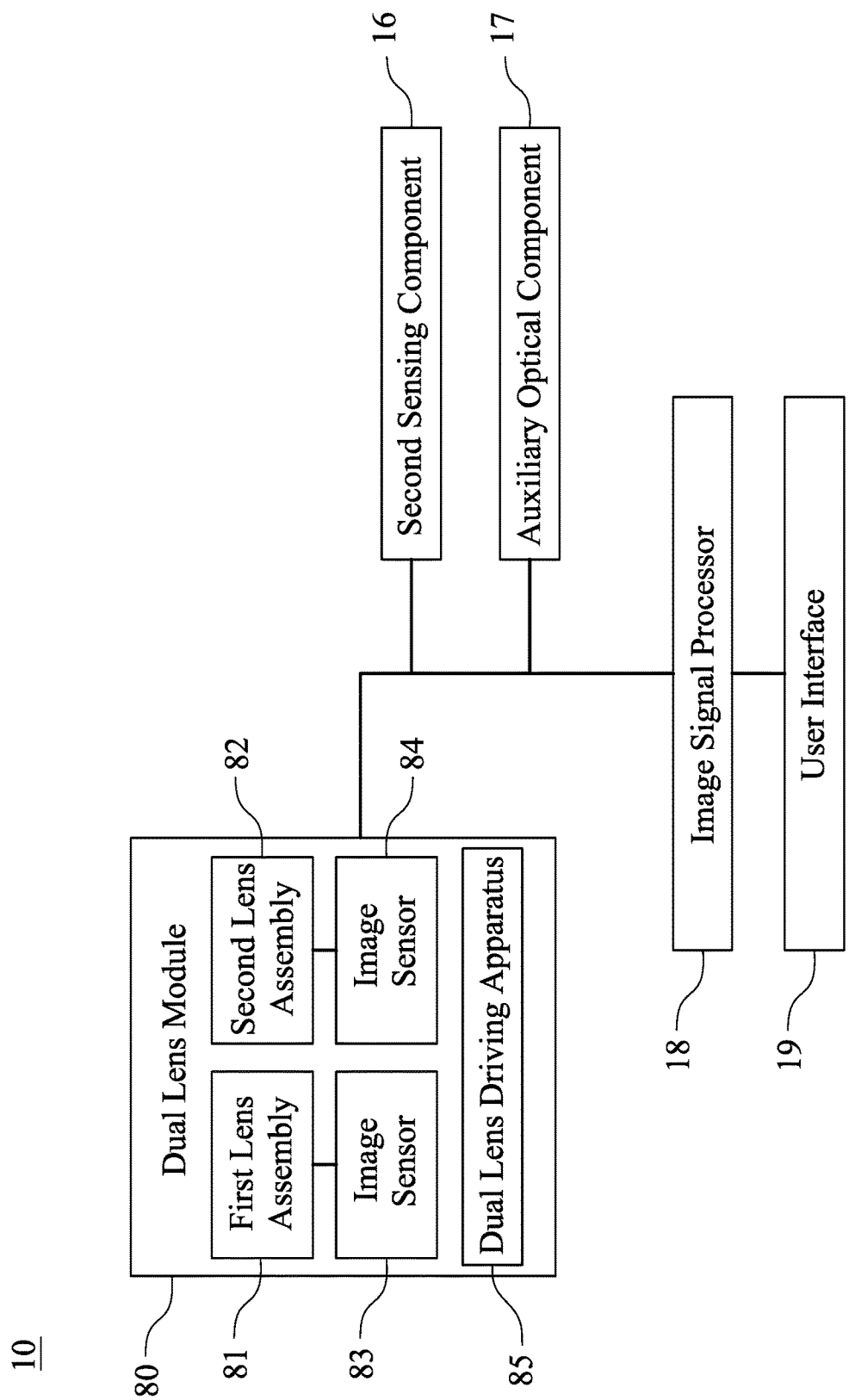
FIG. 3D shows a block diagram of the electronic device according to the 3rd embodiment.

FIG. 3A is a schematic view of a dual lens driving apparatus 85 according to the 3rd embodiment of the present disclosure, a first lens assembly 81 and a second lens assembly 82, FIG. 3B shows a schematic view of an electronic device 10 according to the 3rd embodiment of the present disclosure, FIG. 3C shows another schematic view of the electronic device 10 according to the 3rd embodiment, FIG. 3D shows a block diagram of the electronic device 10 according to the 3rd embodiment, and particularly, FIG. 3B to FIG. 3D are related to a camera of the electronic device 10. In FIG. 3A to FIG. 3D, the electronic device 10 of the 3rd embodiment is a smart phone, the electronic device 10 includes the dual lens driving apparatus 85 according to the present disclosure, the first lens assembly 81, the second lens assembly 82, two image sensors 83 and 84.

In FIG. 3A, the dual lens driving apparatus 85 is for driving the first lens assembly 81 and the second lens assembly 82, and an optical axis of the first lens assembly 81 and an optical axis of the second lens assembly 82 are parallel. The image sensors 83 and 84 are respectively disposed on an image surface of the first lens assembly 81 and an image surface of the second lens assembly 82. Therefore, it is favorable for the electronic device 10 to provide an image scheme of capturing dual images simultaneously.

In detail, the image sensors 83, 84 and two first sensing components 86 of the dual lens driving apparatus 85 can be all disposed on a circuit board 77, such as a flexible printed circuit board (FPC), a printed circuit board and so on. Therefore, it is favorable for simplifying the complexity of circuit design and speeding up the production procedures.

When a maximum field of view of the first lens assembly 81 is FOV1, and a maximum field of view of the second lens assembly 82 is FOV2, the following condition can be satisfied: 0 degrees≤|FOV1−FOV2|≤15 degrees. Therefore, the difference of fields of view between the first lens assembly 81 and the second lens assembly 82 being reduced would be suitable for a capturing function of a dual lens module with similar fields of view.

When a focal length of the first lens assembly 81 is EFL1, and a focal length of the second lens assembly 82 is EFL2, the following condition is satisfied: 0 mm≤|EFL1−EFL2|≤0.85 mm. Therefore, reducing the difference in length between the first lens assembly 81 and the second lens assembly 82 is favorable for preventing the dual lens driving apparatus 85 from spatial interference during focusing.

Figure 3E:
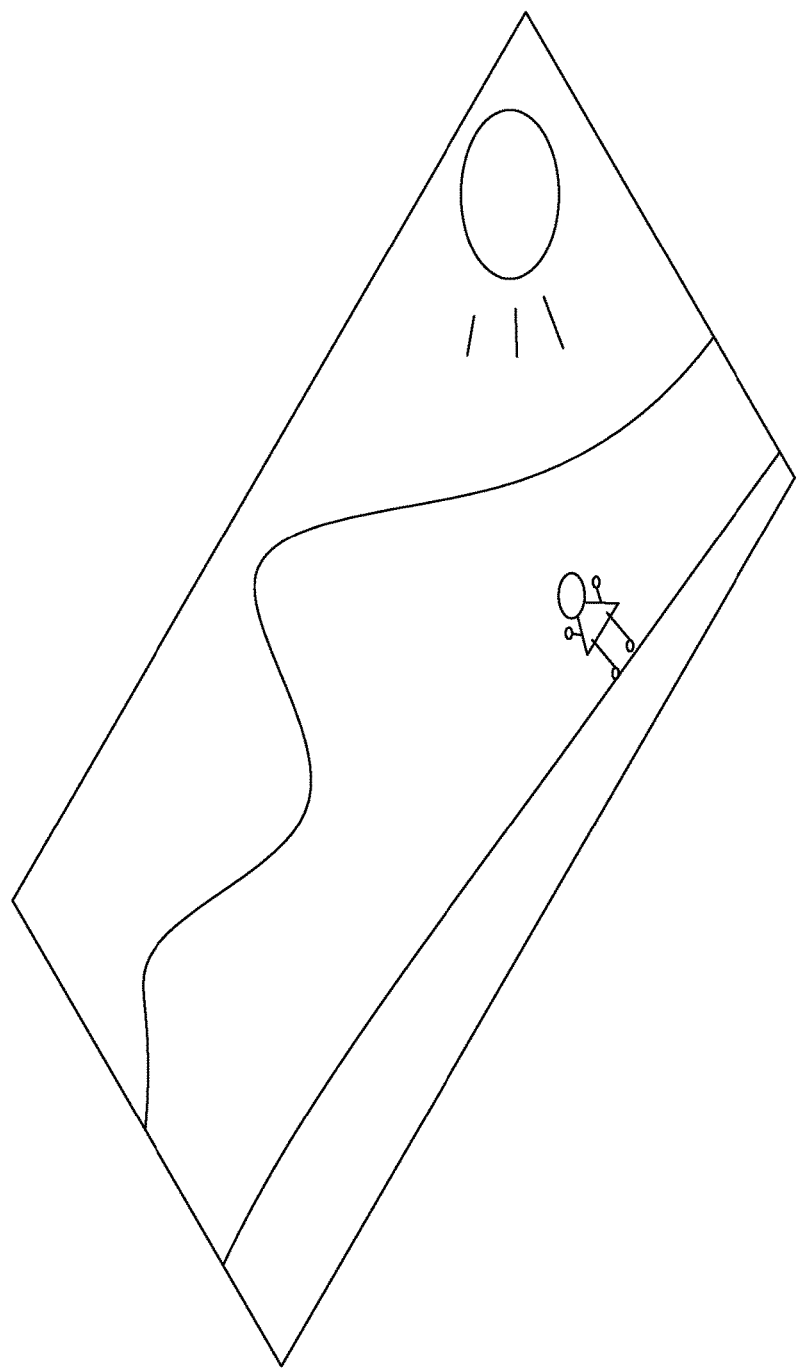
FIG. 3E shows a schematic view of an image provided by an image sensor according to the 3rd embodiment.
Figure 3F:
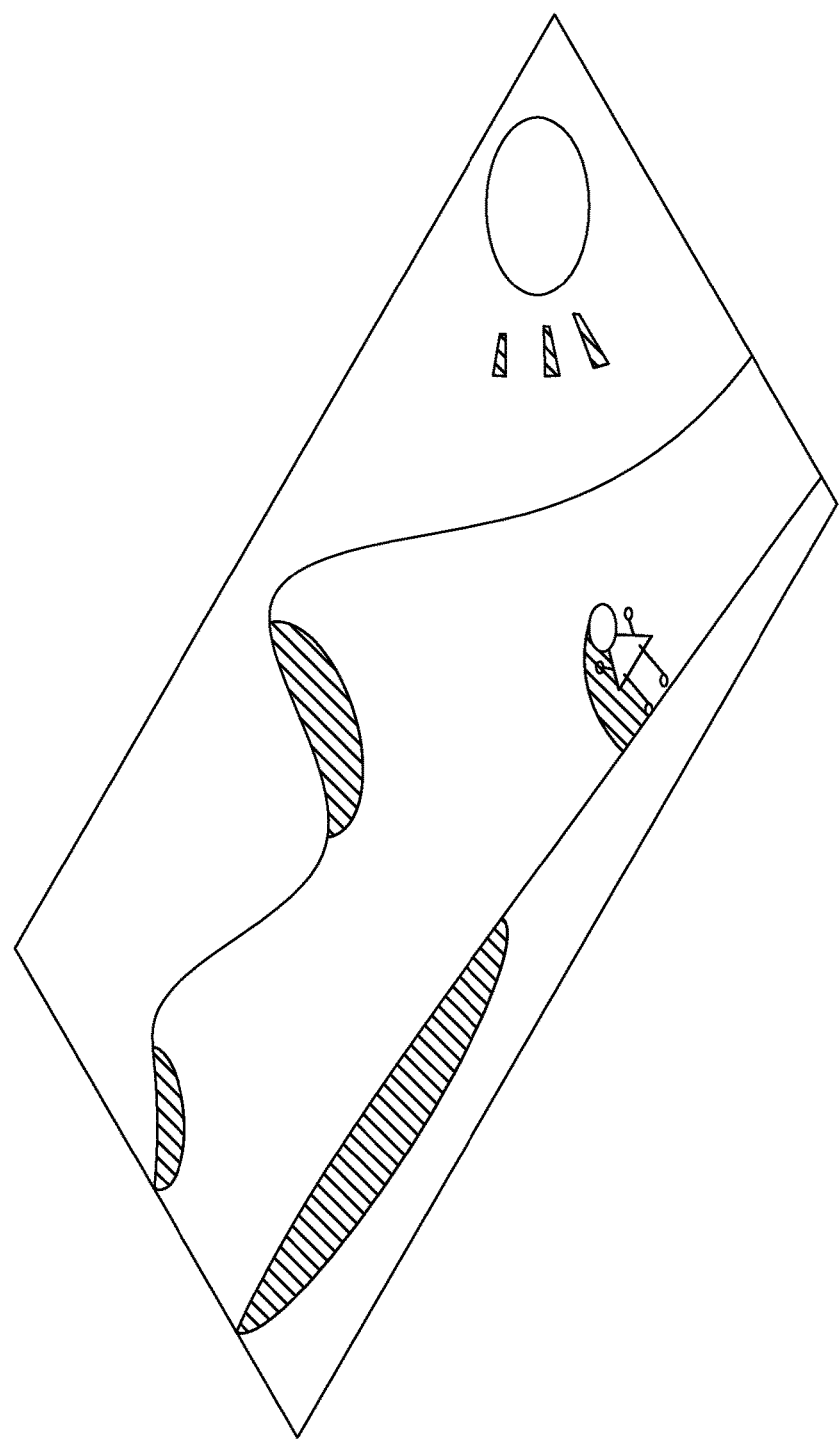
FIG. 3F shows a schematic view of an image provided by another image sensor according to the 3rd embodiment.

FIG. 3E shows a schematic view of an image provided by the image sensor 83 according to the 3rd embodiment, and FIG. 3F shows a schematic view of an image provided by the image sensor 84 according to the 3rd embodiment. In FIG. 3B, FIG. 3E and FIG. 3F, the image sensor 83 can be for providing a color image, and the image sensor 84 can be for providing a monochrome image. That is, an information related the color image output form the image sensor 83 and an information related the monochrome image output form the image sensor 84 can be provided to the components following to perform a processing with a dual lens image algorithm. Therefore, it is favorable for providing various shooting styles and needs based on various corresponding applications of the dual lens module. Furthermore, comparing with the processing with the conventional image algorithm, the electronic device 10 equipped with the dual lens module (i.e. including the first lens assembly 81 and the second lens assembly 82) can simultaneously record the information of the color image being apparent and distinctive and the information of the monochrome image with light and shadow gradually changing for an imaged object, so as to capture the optical information more approaching the real imaged object, have the richer image information provided by the image sensors 83, 84 and processed by the dual lens image algorithm, and thereby achieve a wider range of photographing experiences. In addition, the dual lens driving apparatus 85 can aid and enhance the function of faster photographing and auto-focusing, so that the photographing experiences implemented by the electronic device 10 would become more convenient and more completed.

Furthermore, in FIG. 3B to FIG. 3D, the user activates the capturing mode via a user interface 19 of the electronic device 10, wherein the user interface 19 of the 3rd embodiment can be a touch screen 19a, a button 19b and etc. At this moment, the imaging light is converged on the image sensor 83 of first lens assembly 81 and the image sensor 84 of second lens assembly 82 respectively, and the electronic signal associated with image is output to an image signal processor (ISP) 18.

Based on the camera specification of the electronic device 10, a dual lens module 80 of the electronic device 10 includes the dual lens driving apparatus 85, the first lens assembly 81, the second lens assembly 82, two image sensors 83 and 84. Moreover, the electronic device 10 can further include at least one auxiliary optical component 17 and at least one second sensing component 16. The auxiliary optical component 17 can be a flash module for compensating for the color temperature, an infrared distance measurement component, a laser focus module and etc. The second sensing component 16 can have functions for sensing physical momentum and kinetic energy, and thereby can be an accelerator, a gyroscope, and a hall effect element, to sense shaking or jitters applied by hands of the user or external environments. Accordingly, the functions of the dual lens driving apparatus 85 of the dual lens module 80 can be aided and enhanced to achieve the superior image quality. Furthermore, the electronic device 10 according to the present disclosure can have a capturing function with multiple modes, such as taking optimized selfies, high dynamic range (HDR) under a low light source, 4K resolution recording, etc. Additionally, the user can visually see the captured image of the camera through the touch screen 19a and manually operate the view finding range on the touch screen 19a to achieve the auto focus function of what you see is what you get.

Furthermore, in FIG. 3C, the dual lens module 80, the second sensing component 16 and the auxiliary optical component 17 can be disposed on the circuit board 77, which is a flexible printed circuit board and electrically connected with the associated components, such as the imaging signal processor 18, via a connector 78 to perform a capturing process. Since the current electronic devices, such as smart phones, have a tendency of being compact, the way of firstly disposing the camera module and related components on the flexible printed circuit board and secondly integrating the circuit thereof into the main board of the electronic device via the connector can satisfy the requirements of the mechanical design and the circuit layout of the limited space inside the electronic device, and obtain more margins. The autofocus function of the camera module can also be controlled more flexibly via the touch screen of the electronic device. In the 3rd embodiment, the electronic device 10 includes a plurality of the second sensing components 16 and a plurality of the auxiliary optical components 17. The second sensing components 16 and the auxiliary optical components 17 are disposed on the circuit board 77 and at least one other flexible printed circuit board (its reference numeral is omitted) and electrically connected with the associated components, such as the image signal processor 18, via corresponding connectors to perform the capturing process. In other embodiments (not shown in drawings), the second sensing components and the auxiliary optical components can also be disposed on the main board of the electronic device or carrier boards of other types according to requirements of the mechanical design and the circuit layout.

In addition, the electronic device 10 can further include but not be limited to a wireless communication unit, a control unit, a storage unit, a random access memory, a read-only memory, or a combination thereof.

The data of the aforementioned parameters of the electronic device 10 according to the 3rd embodiment of the present disclosure are listed in the following Table 3.

TABLE 3

| 3rd Embodiment | | | |
|---|---|---|---|
| FOV1 (deg.) | 78.0 | EFL1 (mm) | 3.83 |
| FOV2 (deg.) | 78.0 | EFL2 (mm) | 3.83 |
| \|FOV1 − FOV2\| (deg.) | 0 | \|EFL1 − EFL2\| (mm) | 0 |

4th Embodiment

Figure 4:
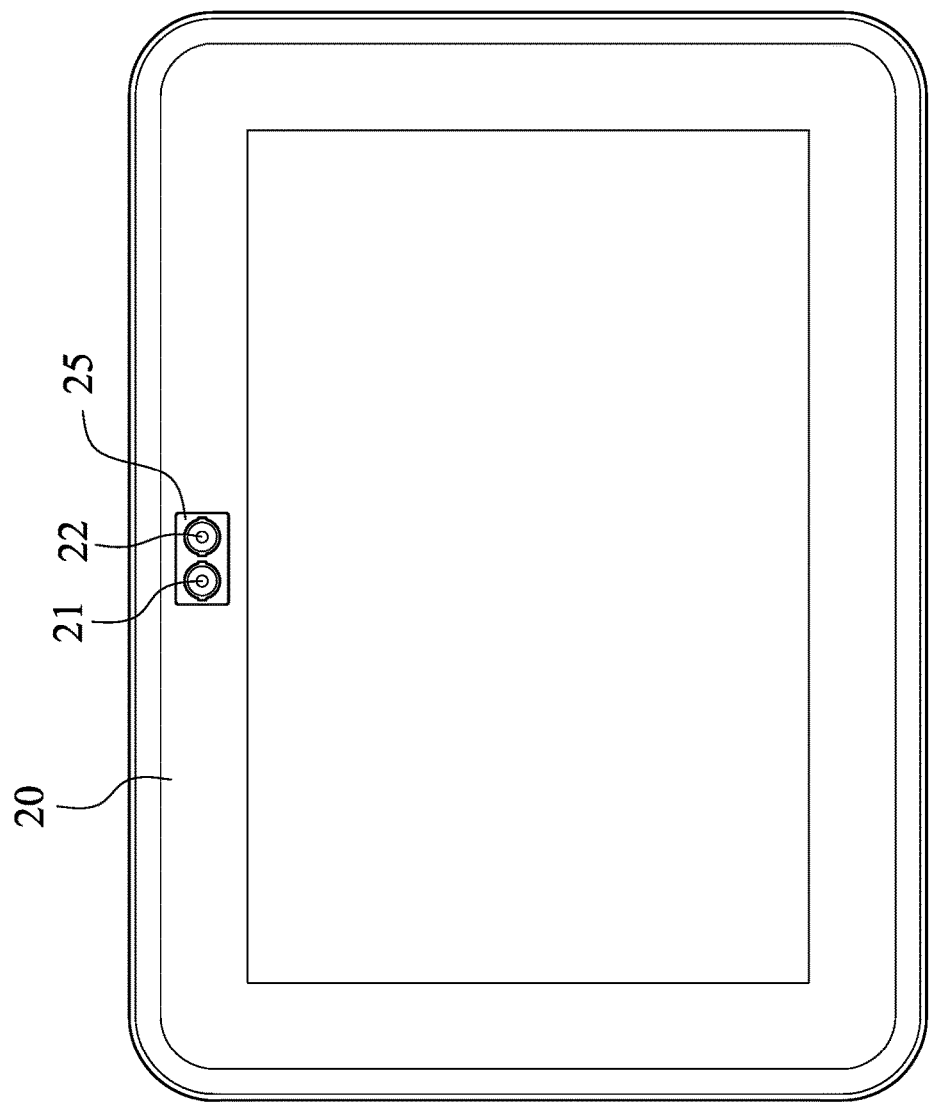
FIG. 4 shows an electronic device according to the 4th embodiment of the present disclosure.

FIG. 4 shows an electronic device 20 according to the 4th embodiment of the present disclosure. The electronic device 20 of the 4th embodiment is a tablet personal computer, the electronic device 20 includes a dual lens driving apparatus 25 according to the present disclosure, a first lens assembly 21, a second lens assembly 22 and two image sensors (not shown herein). The dual lens driving apparatus 25 is for driving the first lens assembly 21 and the second lens assembly 22, and an optical axis of the first lens assembly 21 and an optical axis of the second lens assembly 22 are parallel. The two image sensors are respectively disposed on an image surface (not shown herein) of the first lens assembly 21 and an image surface (not shown herein) of the second lens assembly 22.

In detail, the two image sensors and at least one first sensing component (not shown herein) of the dual lens driving apparatus 25 can be all disposed on a circuit board (not shown herein). One of the image sensors is for providing a color image, and the other of the image sensors is for providing a monochrome image.

The data of the parameters FOV1, FOV2, |FOV1−FOV2|, EFL1, EFL2 and |EFL1−EFL2| of the electronic device 20 according to the 4th embodiment of the present disclosure are listed in the following Table 4. The definitions of these parameters shown in Table 4 are the same as those stated in the electronic device 10 of the 3rd embodiment with corresponding values for the electronic device 20.

TABLE 4

| 4th Embodiment | | | |
|---|---|---|---|
| FOV1 (deg.) | 78.0 | EFL1 (mm) | 3.83 |
| FOV2 (deg.) | 74.6 | EFL2 (mm) | 4.00 |
| \|FOV1 − FOV2\| (deg.) | 3.4 | \|EFL1 − EFL2\| (mm) | 0.17 |

5th Embodiment

Figure 5:
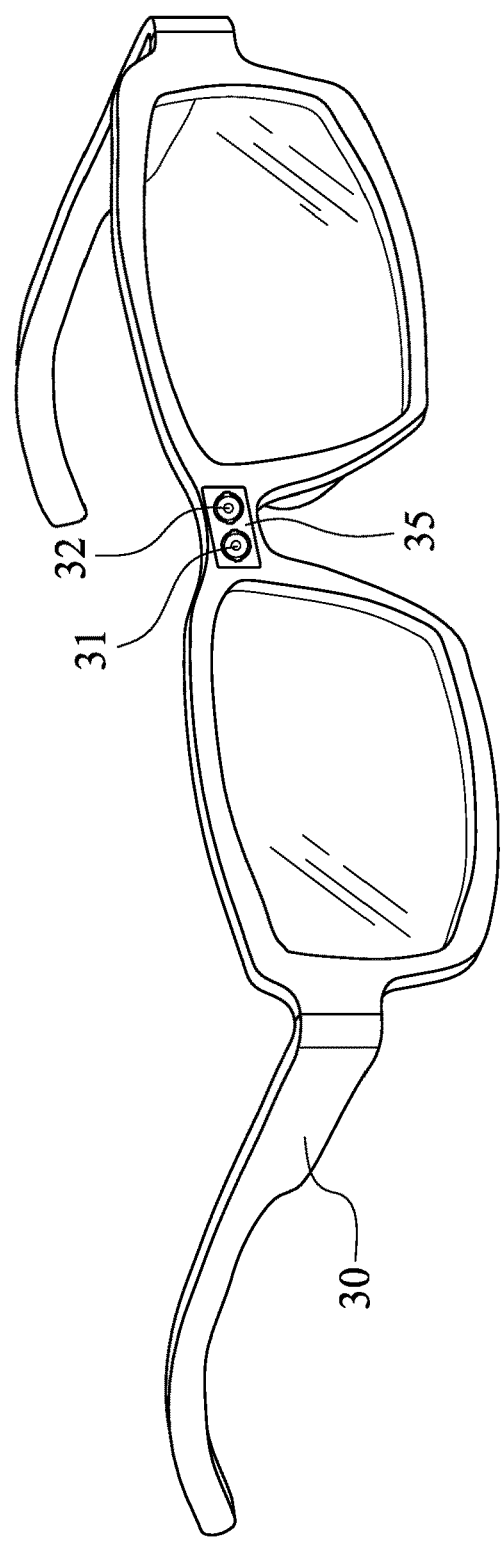
FIG. 5 shows an electronic device according to the 5th embodiment of the present disclosure.

FIG. 5 shows an electronic device 30 according to the 5th embodiment of the present disclosure. The electronic device 30 of the 5th embodiment is a wearable device, the electronic device 30 includes a dual lens driving apparatus 35 according to the present disclosure, a first lens assembly 31, a second lens assembly 32 and two image sensors (not shown herein). The dual lens driving apparatus 35 is for driving the first lens assembly 31 and the second lens assembly 32, and an optical axis of the first lens assembly 31 and an optical axis of the second lens assembly 32 are parallel. The two image sensors are respectively disposed on an image surface (not shown herein) of the first lens assembly 31 and an image surface (not shown herein) of the second lens assembly 32.

In detail, the two image sensors and at least one first sensing component (not shown herein) of the dual lens driving apparatus 35 can be all disposed on a circuit board (not shown herein). One of the image sensors is for providing a color image, and the other of the image sensors is for providing a monochrome image.

The data of the parameters FOV1, FOV2, |FOV1−FOV2|, EFL1, EFL2 and |EFL1−EFL2| of the electronic device 30 according to the 5th embodiment of the present disclosure are listed in the following Table 5. The definitions of these parameters shown in Table 5 are the same as those stated in the electronic device 10 of the 3rd embodiment with corresponding values for the electronic device 30.

TABLE 5

| 5th Embodiment | | | |
|---|---|---|---|
| FOV1 (deg.) | 78.0 | EFL1 (mm) | 3.83 |
| FOV2 (deg.) | 78.0 | EFL2 (mm) | 3.83 |
| \|FOV1 − FOV2\| (deg.) | 0 | \|EFL1 − EFL2\| (mm) | 0 |

Although the present disclosure has been described in considerable detail with reference to the embodiments thereof, other embodiments are possible. Therefore, the spirit and scope of the appended claims should not be limited to the description of the embodiments contained herein. It will be apparent to those skilled in the art that various modifications and variations can be made to the structure of the present disclosure without departing from the scope or spirit of the present disclosure. In view of the foregoing, it is intended that the present disclosure cover modifications and variations of this disclosure provided they fall within the scope of the following claims.

What is claimed is:

1. A dual lens driving apparatus, comprising:
a holder comprising at least one holder opening;
a metal yoke disposed correspondingly to the holder, wherein the metal yoke comprises a front end portion, at least one metal yoke opening is located on the front end portion, and the metal yoke opening is disposed correspondingly to the holder opening;
a carrier movably disposed in the metal yoke, wherein the carrier comprises a first receiving space and a second receiving space, the first receiving space and the second receiving space are for receiving a first lens assembly and a second lens assembly respectively, a central axis of the first receiving space and a central axis of the second receiving space are parallel, the carrier can be moved at least along a first direction, and the first direction is parallel to the two central axes;
a first coil surrounding and disposed on the carrier;
at least one magnet movably disposed in the metal yoke, wherein the magnet can be moved at least along a second direction, and the second direction is vertical to the two central axes; and
at least one first sensing component adjacent to and facing the magnet, wherein the first sensing component is for sensing a displacement along the second direction of the magnet;
wherein a maximum length of the carrier which is parallel to a vertical connection between the two central axes is CL, a minimum length of the front end portion which is vertical to the vertical connection between the two central axes is YS, and the following condition is satisfied:

$$1.18 < CL/YS < 4.0.$$

2. The dual lens driving apparatus of claim 1, further comprising:
at least three metal suspension wires, which are all disposed in the metal yoke and parallel to the two central axes.

3. The dual lens driving apparatus of claim 2, further comprising:
a frame, wherein the carrier is disposed in the frame, and the frame accommodates and is connected to the magnet; and
a spring element connected to the frame, wherein the spring element comprises at least three wire-connecting portions, the wire-connecting portions are respectively corresponding to the metal suspension wires, and each of the wire-connecting portions is connected to one end of one of the metal suspension wires which is corresponding thereto.

4. The dual lens driving apparatus of claim 3, wherein the spring element comprises:
at least one first spring plate, which is assembled on one side of the carrier close to the front end portion of the metal yoke; and
at least one second spring plate, which is assembled on one side of the carrier far from the front end portion.

5. The dual lens driving apparatus of claim 4, wherein only the first spring plate of the first spring plate and the second spring plate comprises the wire-connecting portions, and the first spring plate is assembled with the frame.

6. The dual lens driving apparatus of claim 5, wherein each of the wire-connecting portions comprises a notch for the one of the metal suspension wires which is corresponding thereto be shifted into the notch.

7. The dual lens driving apparatus of claim 1, wherein the magnet comprises at least one parallel surface and at least one vertical surface, the parallel surface is parallel to the two central axes, and the vertical surface is vertical to the two central axes.

8. The dual lens driving apparatus of claim 7, further comprising:
at least one second coil disposed between the magnet and the holder, wherein the second coil is for driving the carrier and the magnet to move along the second direction.

9. The dual lens driving apparatus of claim 8, wherein an air space distance parallel to the two central axes between the second coil and the vertical surface of the magnet is t, and the following condition is satisfied:

$$0.02\ mm < t < 0.70\ mm.$$

10. The dual lens driving apparatus of claim 9, wherein the air space distance parallel to the two central axes between the second coil and the vertical surface of the magnet is t, and the following condition is satisfied:

$$0.05 \text{ mm} < t < 0.40 \text{ mm}.$$

11. The dual lens driving apparatus of claim 1, wherein the maximum length of the carrier which is parallel to the vertical connection between the two central axes is CL, a length of the carrier which is vertical to the vertical connection between the two central axes and passing through the central axis of the first receiving space is CS1, a length of the carrier which is vertical to the vertical connection between the two central axes and passing through the central axis of the second receiving space is CS2, and the following conditions are satisfied:

$$1.45 < CL/CS1 < 4.5; \text{ and}$$

$$1.45 < CL/CS2 < 4.5.$$

12. The dual lens driving apparatus of claim 3, wherein a number of the holder opening is two, the two holder openings are respectively corresponding to the first receiving space and the second receiving space, a maximum length of the holder which is parallel to the vertical connection between the two central axes is HL, the minimum length of the front end portion which is vertical to the vertical connection between the two central axes is YS, and the following condition is satisfied:

$$1.18 < HL/YS < 4.0.$$

13. The dual lens driving apparatus of claim 3, wherein a volume proportion of each of the metal suspension wires having a cross-sectional plane vertical to the two central axes being square or rectangular is above 95%.

14. The dual lens driving apparatus of claim 3, wherein the holder comprises at least three metal connecting portions without being in contact with each other, the metal connecting portions are respectively corresponding to the metal suspension wires, and each of the metal connecting portions is connected to the other end of one of the metal suspension wires which is corresponding thereto.

15. The dual lens driving apparatus of claim 14, wherein the metal connecting portions are disposed on the holder by an insert molding method.

16. The dual lens driving apparatus of claim 14, wherein each of the metal connecting portions comprises a notch for the one of the metal suspension wires which is corresponding thereto be shifted into the notch.

17. The dual lens driving apparatus of claim 2, wherein the carrier can be moved along at least three directions, which are the first direction, the second direction and a third direction, the first direction is orthogonal to both the second direction and the third direction, a number of the first sensing component is at least two, and the first sensing components are Hall effect elements.

18. The dual lens driving apparatus of claim 3, wherein the magnet is cuboid.

19. The dual lens driving apparatus of claim 18, wherein a number of the magnet is at least two, at least one of the magnets is a first cuboid magnet, at least another one of the magnets is a second cuboid magnet, the first cuboid magnet and the second cuboid magnet are alternatively arranged to surround the carrier, and a length along the carrier of the first cuboid magnet is greater than a length along the carrier of the second cuboid magnet.

20. An electronic device, comprising:
the dual lens driving apparatus of claim 1;
the first lens assembly, wherein the dual lens driving apparatus is for driving the first lens assembly;
the second lens assembly, wherein the dual lens driving apparatus is for driving the second lens assembly, and an optical axis of the first lens assembly and an optical axis of the second lens assembly are parallel; and
two image sensors, wherein the image sensors are respectively disposed on an image surface of the first lens assembly and an image surface of the second lens assembly.

21. The electronic device of claim 20, wherein a maximum field of view of the first lens assembly is FOV1, a maximum field of view of the second lens assembly is FOV2, and the following condition is satisfied:

$$0 \text{ degrees} \leq |FOV1 - FOV2| \leq 15 \text{ degrees}.$$

22. The electronic device of claim 20, wherein a focal length of the first lens assembly is EFL1, a focal length of the second lens assembly is EFL2, and the following condition is satisfied:

$$0 \text{ mm} < |EFL1 - EFL2| < 0.85 \text{ mm}.$$

23. The electronic device of claim 20, wherein the image sensors and the first sensing component are all disposed on a circuit board.

24. The electronic device of claim 20, wherein one of the image sensors is for providing a color image, and the other of the image sensors is for providing a monochrome image.

* * * * *